(12) United States Patent
Carlson et al.

(10) Patent No.: US 12,541,483 B1
(45) Date of Patent: Feb. 3, 2026

(54) SIGNAL PROCESSING AND TRANSMISSION IN ELECTRONIC CIRCUITS

(71) Applicant: Auradine, Inc., Santa Clara, CA (US)

(72) Inventors: David Carlson, Haslet, TX (US); Tao Xu, Saratoga, CA (US)

(73) Assignee: Auradine, Inc., Santa Clara, CA (US)

( * ) Notice: Subject to any disclaimer, the term of this patent is extended or adjusted under 35 U.S.C. 154(b) by 130 days.

(21) Appl. No.: 18/217,185

(22) Filed: Jun. 30, 2023

(51) Int. Cl.
*G06F 15/78* (2006.01)
*H03K 19/20* (2006.01)
*H04L 9/00* (2022.01)

(52) U.S. Cl.
CPC ......... *G06F 15/7817* (2013.01); *H03K 19/20* (2013.01); *H04L 9/50* (2022.05)

(58) Field of Classification Search
None
See application file for complete search history.

(56) References Cited

U.S. PATENT DOCUMENTS

| | | | | |
|---|---|---|---|---|
| 2005/0065618 | A1* | 3/2005 | Burkatovsky | G05B 19/0426 700/1 |
| 2006/0095711 | A1* | 5/2006 | Aridor | G06F 9/5061 712/15 |
| 2009/0049275 | A1* | 2/2009 | Kyo | G06F 15/80 712/20 |
| 2011/0083136 | A1* | 4/2011 | Shinozaki | G06F 9/5044 718/107 |
| 2014/0070269 | A1 | 3/2014 | Okamoto | |
| 2018/0174032 | A1* | 6/2018 | Davies | G06N 3/063 |
| 2019/0319803 | A1* | 10/2019 | Misoczki | H04L 9/0852 |
| 2019/0370807 | A1 | 12/2019 | Hu et al. | |
| 2020/0238721 | A1 | 7/2020 | Matsumoto | |
| 2021/0073171 | A1* | 3/2021 | Master | G06F 15/80 |
| 2021/0081336 | A1 | 3/2021 | Bradshaw et al. | |
| 2021/0152432 | A1 | 5/2021 | Kelley et al. | |
| 2021/0286735 | A1 | 9/2021 | Kuga | |
| 2021/0365651 | A1 | 11/2021 | Yu et al. | |
| 2022/0197653 | A1* | 6/2022 | Ould-Ahmed-Vall | G06F 9/30032 |
| 2022/0300418 | A1* | 9/2022 | Baugh | G06F 12/0284 |
| 2023/0341449 | A1 | 10/2023 | Petrovic et al. | |

FOREIGN PATENT DOCUMENTS

WO WO-2019071026 A1 * 4/2019 ............. G06N 10/00

OTHER PUBLICATIONS

Watanabe, H, et al. A Novel Chip-Level Blockchain Security Solution for the Internet of Things Networks, 2019 , Technologies,20 pages. (Year: 2019).*

* cited by examiner

*Primary Examiner* — Eric Coleman
(74) *Attorney, Agent, or Firm* — Fish & Richardson P.C.

(57) ABSTRACT

An integrated circuit (IC) chip receives an input signal on a bus connecting a number of IC chips in series. The IC chip is one of the number of IC chips. The IC chip performs a combining operation and an inverting operation on a signal produced by the IC chip and the input signal to generate an output signal. The IC chip sends the output signal to a next chip of the number of IC chips on the bus.

40 Claims, 10 Drawing Sheets

SIGNAL PROCESSING AND TRANSMISSION IN ELECTRONIC CIRCUITS

TECHNICAL FIELD

The following disclosure generally relates to signal processing and transmission, and more specifically, to methods, integrated circuit (IC) chips, and electronic circuits related to processing and transmitting signals with reduced latency.

BACKGROUND

An electronic circuit can include multiple IC chips arranged in a particular topology, e.g., in series, in parallel, or a combination of both. Each of the IC chips in the electronic circuit can communicate with its neighboring chips.

SUMMARY

The present disclosure describes methods, integrated circuit (IC) chips, and electronic circuits to process and transmit signals with reduced latency. An electronic circuit includes a number of IC chips connected in series using multiple buses. The IC chips are connected such that input terminals of one IC chip are connected to output terminals of an upstream neighboring IC chip, and output terminals of the IC chip are connected to input terminals of a downstream neighboring IC chip. Each IC chip can receive an input signal from its upstream neighboring IC chip, combine its own signal with the input signal to generate a combined signal, and transmit the combined signal as an output signal to its downstream neighboring IC chip. By using the above combine-and-forward method, the output signal can be promptly transmitted without undergoing synchronization or retiming processes. By eliminating store-and-forward mechanism for data, the circuit minimizes delays typically incurred during those processes. The combining and forwarding of the signals enable swift transmission without latency-inducing operations.

Each IC chip includes components to invert communication signals at each chip. This deliberate inversion serves as a beneficial measure to prevent the accumulation of a specific class of noise. By inverting the signal at each chip, the noise that may have been introduced in previous stages of the circuit is counteracted, thus maintaining signal integrity.

Each IC chip possesses the ability to self-discover its position within the electronic circuit, allowing it to determine whether it has an odd or even configuration in an ordered arrangement of the number of IC chips in the electronic circuit. This self-discovery enables the IC chip to handle the inversion of the communication signals internally, ensuring that the overall electronic circuit functions as intended.

In a general aspect, an IC chip performs a method that comprises: receiving a first input signal on a first bus connecting a plurality of IC chips in series; performing a combining operation and an inverting operation on a signal produced by the IC chip and the first input signal to generate a first output signal; and sending the first output signal to a next chip of the plurality of IC chips on the first bus.

Particular implementations may include one or more of the following features.

In some implementations, the first input signal is received from a previous chip of the plurality of IC chips connected in series on the first bus.

In some implementations, the first input signal comprises a result of a computation operation performed by the previous chip, and wherein the signal produced by the IC chip comprises a result of a computation operation performed by the IC chip.

In some implementations, the first output signal sent by the IC chip corresponds to an input signal for the next chip on the first bus. In such implementations, the method performed by the IC chip further comprises: performing a combining operation and an inverting operation on a signal produced by of the next chip and the first output signal to generate an output signal of the next chip.

In some implementations, the method performed by the IC chip further comprises: determining an evenness or oddness of the IC chip with respect to a first signal transmission direction on the first bus, wherein the evenness or oddness of the IC chip represents an even or odd numbering of the IC chip in a positioning arrangement of the plurality of IC chips connected in series. In such implementations, determining the evenness or oddness of the IC chip with respect to the first signal transmission direction on the first bus comprises: determining that the first bus is in an idle state; and in response to determining that the first bus is in the idle state, determining that the IC chip is an even chip with respect to the first signal transmission direction when an input signal to the IC chip indicates a first logic state; or in response to determining that the first bus is in the idle state, determining that the IC chip is an odd chip with respect to the first signal transmission direction when an input signal to the IC chip indicates a second logic state, wherein the first logic state is one of a logic high state or a logic low state, and the second logic state is the other one of the logic high state or the logic low state.

In some implementations, performing the combining operation and the inverting operation on the signal produced by the IC chip and the first input signal comprises: in response to determining that the IC chip is an even chip with respect to the first signal transmission direction on the first bus: performing the combining operation on the signal produced by the IC chip and the first input signal to generate a first combined signal; and performing the inverting operation on the first combined signal to generate the first output signal.

In some implementations, performing the combining operation and the inverting operation on the signal produced by the IC chip and the first input signal comprises: in response to determining that the IC chip is an odd chip with respect to the first signal transmission direction on the first bus: performing the inverting operation on the first input signal to generate a first inverted signal; and performing the combining operation on the first inverted signal and the signal produced by the IC chip to generate the first output signal.

In some implementations, the method performed by the IC chip further comprises: receiving a second input signal on a second bus connecting the plurality of IC chips in series; performing an inverting operation on the second input signal to generate a second output signal; and sending the second output signal to the next chip on the second bus. In such implementations, the method further comprises: determining an evenness or oddness of the IC chip with respect to a second signal transmission direction on the second bus.

In some implementations, determining the evenness or oddness of the IC chip with respect to the second signal transmission direction on the second bus comprises: determining that the second bus is in an idle state; and in response to determining that the second bus is in the idle state, determining that the IC chip is an even chip with respect to the second signal transmission direction when an input signal to the IC chip indicates a first logic state; or in response to determining that the second bus is in the idle state, determining that the IC chip is an odd chip with respect to the second signal transmission direction when an input signal to the IC chip indicates a second logic state.

In some implementations, the method further comprises one of: in response to determining that the IC chip is an even chip with respect to the second signal transmission direction on the second bus, sending the second input signal to a controller circuit of the IC chip; or in response to determining that the IC chip is an odd chip with respect to the second signal transmission direction on the second bus, sending the second output signal to the controller circuit of the IC chip, wherein the controller circuit is configured to provide the signal produced by the IC chip for the combining operation.

In some implementations, the first bus is a response bus, and the second bus is a command bus.

Implementations include an IC chip. The IC chip comprises: a plurality of input terminals on a plurality of buses connected to the IC chip, wherein the plurality of input terminals are coupled to output terminals of an upstream neighboring chip of a plurality of chips that is series connected to the IC chip using the plurality of buses; a plurality of output terminals on the plurality of buses, wherein the plurality of output terminals are coupled to input terminals of a downstream neighboring chip of the plurality of chips that is series connected to the IC chip using the plurality of buses, wherein the plurality of chips comprises the IC chip, the upstream neighboring chip and the downstream neighboring chip; a first circuit for processing signals on a first bus of the plurality of buses; and a controller circuit configured to provide the signal produced by the IC chip to the first circuit. The IC chip is configured to perform the above-described operations.

Implementations further include an electronic circuit comprising a plurality of IC chips that are series connected using a plurality of buses. The electronic circuit is configured to perform the above described operations.

The details of one or more implementations of the subject matter of this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
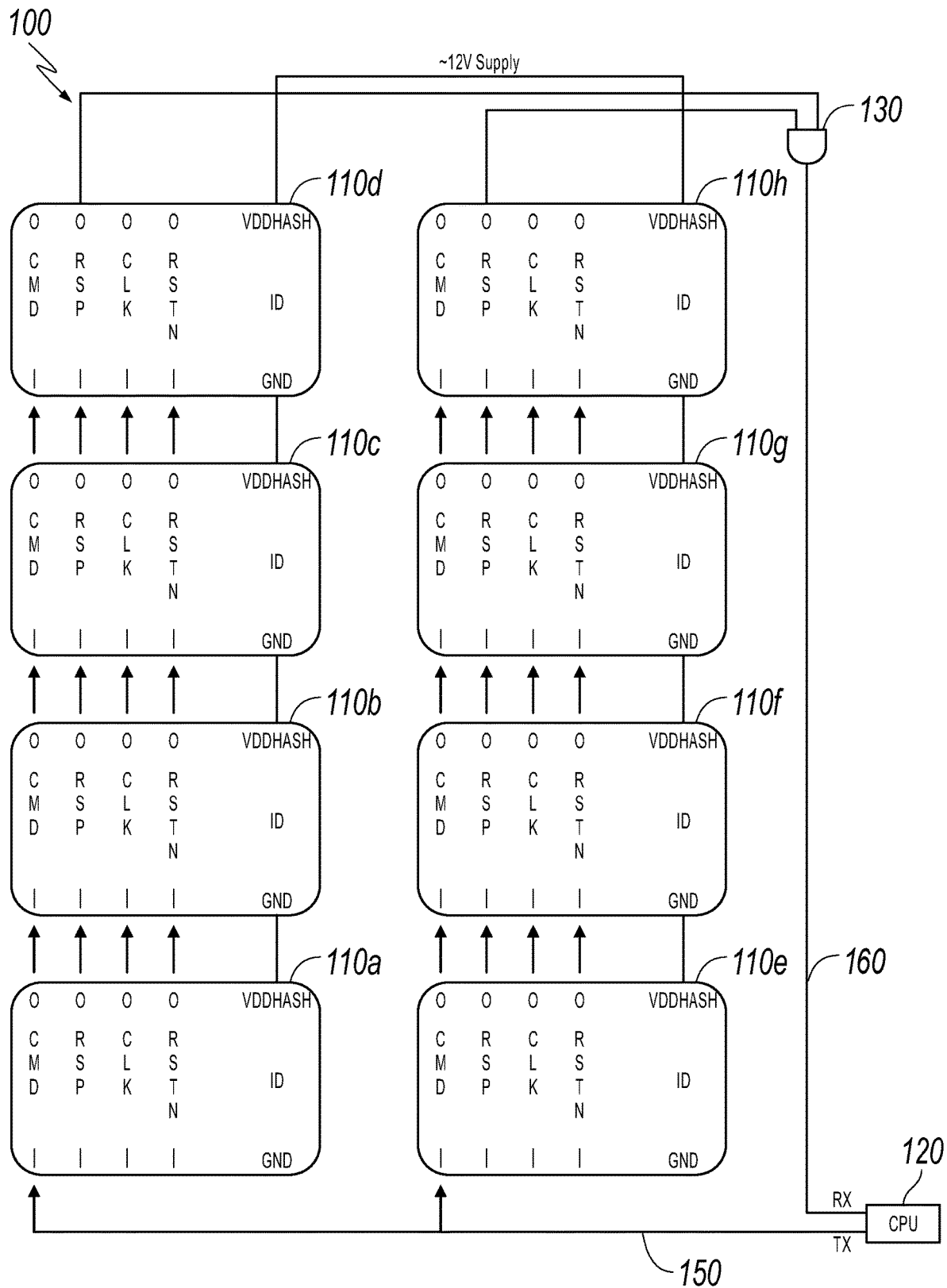
FIG. 1 shows a schematic diagram of an example electronic circuit for signal processing, according to some implementations.

FIG. 1 shows a schematic diagram of an example electronic circuit 100 for signal processing, in accordance with some implementations of the present disclosure. As shown, electronic circuit 100 includes integrated circuit (IC) chips 110a-110h that are series connected using multiple buses. Chips 110a, 110b, 110c, and 110d are connected in series and form a daisy chain by coupling output terminals of one chip to input terminals of a downstream neighboring chip and coupling input terminals of one chip to output terminals of an upstream neighboring chip. Similarly, IC chips 110e, 110f, 110g, and 110h are connected in series and form another daisy chain. Note that electronic circuit 100 in FIG. 1 is shown to include eight chips arranged in two daisy chains for illustrative purposes only. In some implementations, electronic circuit 100 can include any suitable number of chips (e.g., in the order of tens, hundreds, or thousands of chips) arranged in any suitable number of daisy chains.

In some implementations, each one of chips 110a-110h is an application-specific integrated circuit (ASIC). In some implementations, electronic circuit 100 includes multiple buses, such as a command bus, a response bus, a clock bus, and a reset bus, etc. Each one of chips 110a-110h can include a pair of input and output terminals coupled to a respective bus of the electronic circuit 100. For example, each one of chips 110a-110h includes a pair of input and output terminals coupled to command bus 150, and a pair of input and output terminals coupled to response bus 160. Each one of chips 110a-110h can further include a pair of input and output terminals coupled to a clock bus, and a pair of input and output terminals coupled to a reset bus.

In some implementations, each one of chips 110a-110h has an odd or even configuration in an ordered arrangement of chips 110a-110h. In some implementations, chips 110a, 110c, 110e, and 110g are even chips associated with even numbers, e.g., 0, 2, 4, and 6, respectively, and chips 110b, 110d, 110f, and 110h are odd chips associated with odd numbers, e.g., 1, 3, 5, 7, respectively.

In some implementations, electronic circuit 100 is configured to perform cryptographic operations, e.g., a blockchain mining process, using the chips 110a-110h. In such cases, the electronic circuit can be deployed for applications that rely on blockchain mining, e.g., for cryptocurrency mining, maintain linked records of digital transactions, etc. In this context, a blockchain is a decentralized and distributed digital ledger that records units of information, e.g., transactions, across multiple computers or nodes. In a blockchain, transactions are grouped into blocks and added to a chain of previous block, forming a chronological sequence. Each block includes a unique identifier, e.g., hash value, and a reference to the previous block, creating a linked structure. The blocks in the same blockchain are linked by having their hash values inserted into a designated field, e.g., a block header, in the next sequential block in the blockchain. A process of blockchain mining is designed to allow a blockchain system to reach a consensus in which all computation nodes in the blockchain system agree to a same blockchain.

An example mining process by a computation node of a blockchain system can include computing a valid proof-of-work for a block candidate that will be added to a blockchain. The proof-of-work for a block can include a nonce value that, when inserted into a designated field of the block, makes the cryptographic hash value of the block meets, e.g., equal to or less than, a certain difficulty target set by the system.

In some implementations, chips 110a-110h can be configured or customized to perform computations instructed by CPU 120. In some examples, each one of chips 110a-110h can receive an input signal from CPU 120 instructing chips 110a-110h to perform computations for a particular task. After receiving the input signal, each one of chips 110a-110h can perform the computations indicated by the input signal and transmit an output signal to CPU 120.

In some implementations, CPU 120 is configured to carry out arithmetic and logic operations, data manipulations, and control flow management in accordance with operations of electronic circuit 100. In some examples, CPU 120 can include components such as a control unit, an arithmetic logic unit, one or more registers, and one or more caches, etc. The control unit of CPU 120 manages the flow of data between different components of CPU 120, and can be configured to fetch instructions from a memory, decode the instructions, and coordinate execution of the instructions. The arithmetic logic unit can be configured to perform arithmetic operations (e.g., addition, subtraction, multiplication, and division), and logical operations (e.g., AND, OR, and NOT) on data. The registers of CPU 120 can be configured to store temporary data, instructions, and intermediate results during processing. The registers can also include a program counter which keeps track of the address of the next instruction to be executed, and general-purpose registers for storing data. The caches of CPU 120 can be configured to temporarily store frequently accessed data and instructions.

In the shown example, CPU 120 can be configured to transmit an input signal on command bus 150. The input signal can reach chips 110a and 110e, and can be forwarded to next chips in a respective daisy chain.

In some implementations, AND gate 130 is a circuit or a device that performs a logical conjunction operation. For example, AND gate 130 can output a logic high signal (e.g., 1) when all of its input signals are logic high signals. If any of the input signals is a logic low signal (e.g., 0), AND gate 130 can output a logic low signal. In the shown example, AND gate can be configured to perform a logical conjunction operation based on response output signals from chips 110d and 110h, and transmit an operation result to CPU 120 on response bus 160.

Note that electronic circuit 100 is shown to include one AND gate 130 for illustrative purposes only. In some implementations, electronic circuit 100 includes more than one AND gates 130. For example, when electronic circuit 100 includes more than two daisy chains, multiple AND gates 130 can be linked and cascaded to perform logical conjunction operations based on response output signals from the daisy chains.

In some implementations, an example operating process of electronic circuit 100 includes sending a signal by CPU 120 on command bus 150 to chips 110a-110h. The signal can indicate a command to perform a particular task. Each one of chips 110a-110h receives the signal on command bus 150, performs one or more computations corresponding to the particular task and produces one or more computation results, and transmits the computation results on response bus 160. Each one of chips 110a-110h can combine its own computation results with an input signal on response bus 160 from an upstream neighboring chip to generate a combined signal, and transmits the combined signal as an output signal on response bus 160 to a downstream neighboring chip. Output signals from chips 110d and 110h are combined by using AND gate 130 to generate a combined signal, which is then transmitted on response bus 160 to CPU 120.

In some examples related to a mining process, CPU 120 can send a signal on command bus 150 to chips 110a-110h, where the signal indicates a command to perform hash computations to find a nonce for a current block header that makes a hash of the block header meet a difficulty target. Each one of chips 110a-110h performs the hash computations in response to the signal. In some examples, a chip can randomly choose a nonce and insert the nonce to the current block header, and generate a new block header hash. If the new block header hash is less than or equal to that indicated by the difficulty target, the chip can generate a computation result based on the nonce. This process can be repeated until a chip finds a nonce that produces a hash that is less than or equal to that indicated by the difficulty target.

In some examples, when one of the chips 110a-110h obtains a nonce that makes the new block header hash meet the difficulty target, the chip can generate a data signal indicating the nonce. In some examples, the data signal is a series of bits in a pattern that indicates a value of the nonce. When one of the chips 110a-110h does not obtain a nonce that makes the new block header hash meet the difficulty target, the chip can generate an idle signal or stay quiet. In some examples, the idle signal is a series of bits in a known pattern, e.g., a known number of 0s or 1s that indicates idle or not hit. When one of the chips 110a-110h receives an input signal on response bus 160 from an upstream neighboring chip in a same daisy chain, the chip can combine its own signal (e.g., the data signal or idle signal) and the input signal to generate a combined signal, and transmit the combined signal as an output signal on response bus 160.

By using the above combine-and-forward method, the output signal of a chip can be promptly transmitted without undergoing synchronization or retiming processes. In doing so, the electronic circuit avoids store-and-forward mechanism for data, which minimizes delays typically incurred during those processes. The combining and forwarding of the signals enable swift transmission without latency-inducing operations.

In the shown example of FIG. 1, the command terminals and the response terminals of chips 110a-110h are routed in a same direction on command bus 150 and response bus 160. For example, the command terminals of chips 110a-110d are connected such that a signal transmission direction through chips 110a-110d on command bus 150 is from chip 110a to chip 110d. The response terminals of chips 110a-110d are connected such that a signal transmission direction through chips 110a-110d on response bus 160 is also from chip 110a to chip 110d.

Similarly, the command terminals of chips 110e-110h are connected such that a signal transmission direction through chips 110e-110h on command bus 150 is from chip 110e to chip 110h. The response terminals of chips 110e-110h are connected such that a signal transmission direction through chips 110e-110h on response bus 160 is also from chip 110e to chip 110h.

Figure 2:
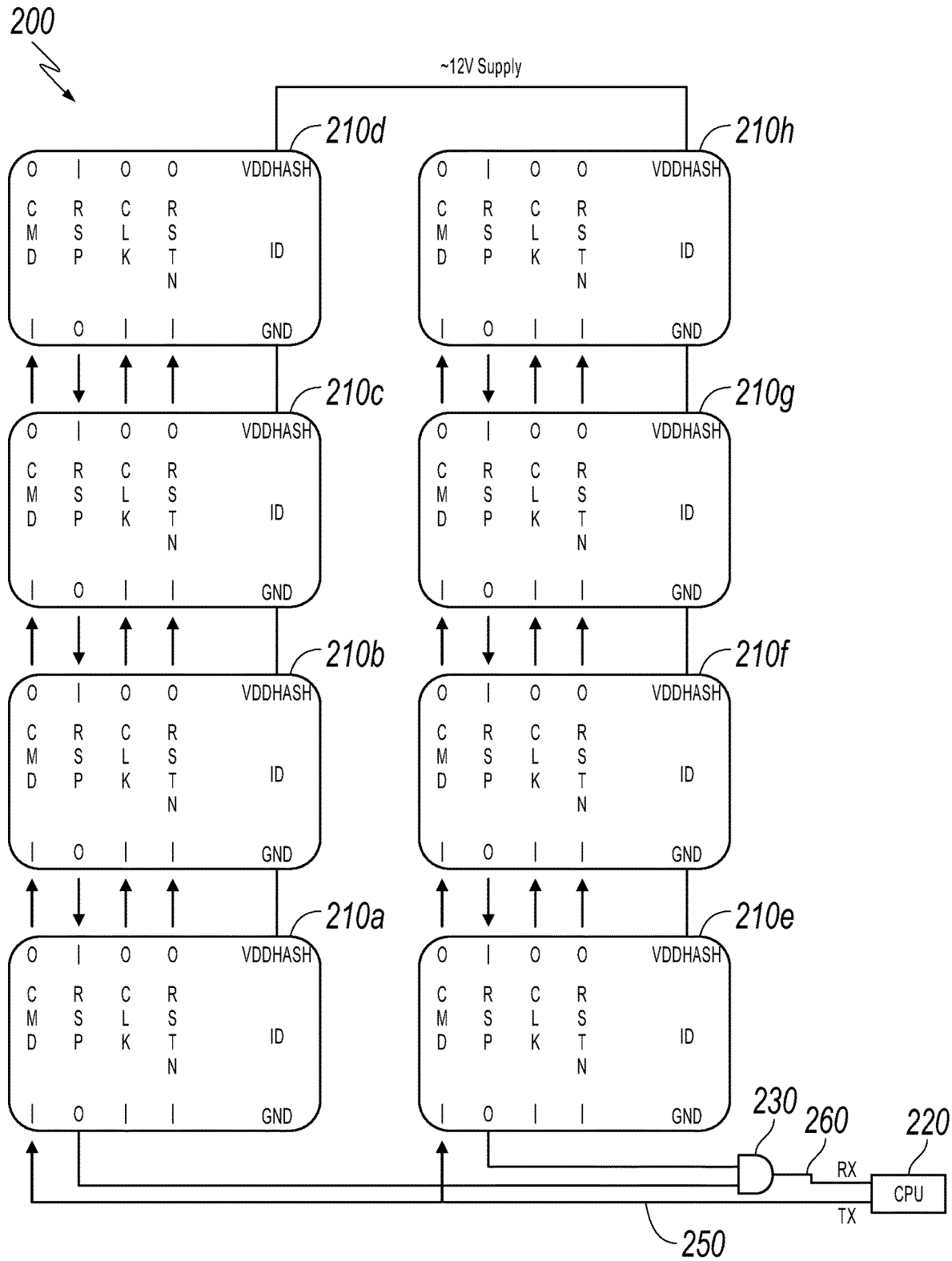
FIG. 2 shows a schematic diagram of another example electronic circuit for signal processing, according to some implementations.

FIG. 2 shows a schematic diagram of another example electronic circuit 200 for signal processing, in accordance with some implementations of the present disclosure. As shown, electronic circuit 200 includes IC chips 210a-210h that are series connected using multiple buses. Chips 210a, 210b, 210c, and 210d are connected in series and form a daisy chain by coupling output terminals of one chip to input terminals of a downstream neighboring chip and coupling input terminals of one chip to output terminals of an upstream neighboring chip. Similarly, chips 210e, 210f, 210g, and 210h are connected in series and form another daisy chain. Note that electronic circuit 200 in FIG. 2 is shown to include eight chips arranged in two daisy chains for illustrative purposes only. In some implementations, electronic circuit 200 can include any suitable number of chips (e.g., in the order of tens, hundreds, or thousands of chips) arranged in any suitable number of daisy chain. Chips 210a-210h, CPU 220, command bus 250, response bus 260 are similar to chips 110a-110h, CPU 120, command bus 150, and response 160, respectively. Accordingly, some descriptions of chips 210a-210h are omitted here for brevity.

In the shown example of FIG. 2, the command terminals and the response terminals of chips 210a-210h are routed in different directions on command bus 250 and response bus 260. For example, the command terminals of chips 210a-210d are connected such that a signal transmission direction through chips 210a-210d on command bus 250 is from chip 210a to chip 210d. The response terminals of chips 210a-210d are connected such that a signal transmission direction through chips 210a-210d on response bus 260 is from chip 210d to chip 210a.

Similarly, the command terminals of chips 210e-210h are connected such that a signal transmission direction through chips 210e-210h on command bus 250 is from chip 210e to chip 210h. The response terminals of chips 210e-210h are connected such that a signal transmission direction through chips 210e-210h on response bus 260 is from chip 210h to chip 210e.

In some implementations, each one of chips 210a-210h has an odd or even configuration in an ordered arrangement of chips 210a-210h. In some implementations, each one of chips 210a-210h can have different odd or even configurations with respect to command bus 250 and response bus 260. In some examples, chips 210a, 210c, 210e, and 210g can be even chips, and chips 210b, 210d, 210f, and 210h can be odd chips with respect to a first signal transmission direction on command bus 250. In some examples, chips 210d, 210b, 210h, and 210f can be even chips, and chips 210c, 210a, 210g, and 210e can be odd chips with respect to a second signal transmission direction on response bus 260.

Figure 3:
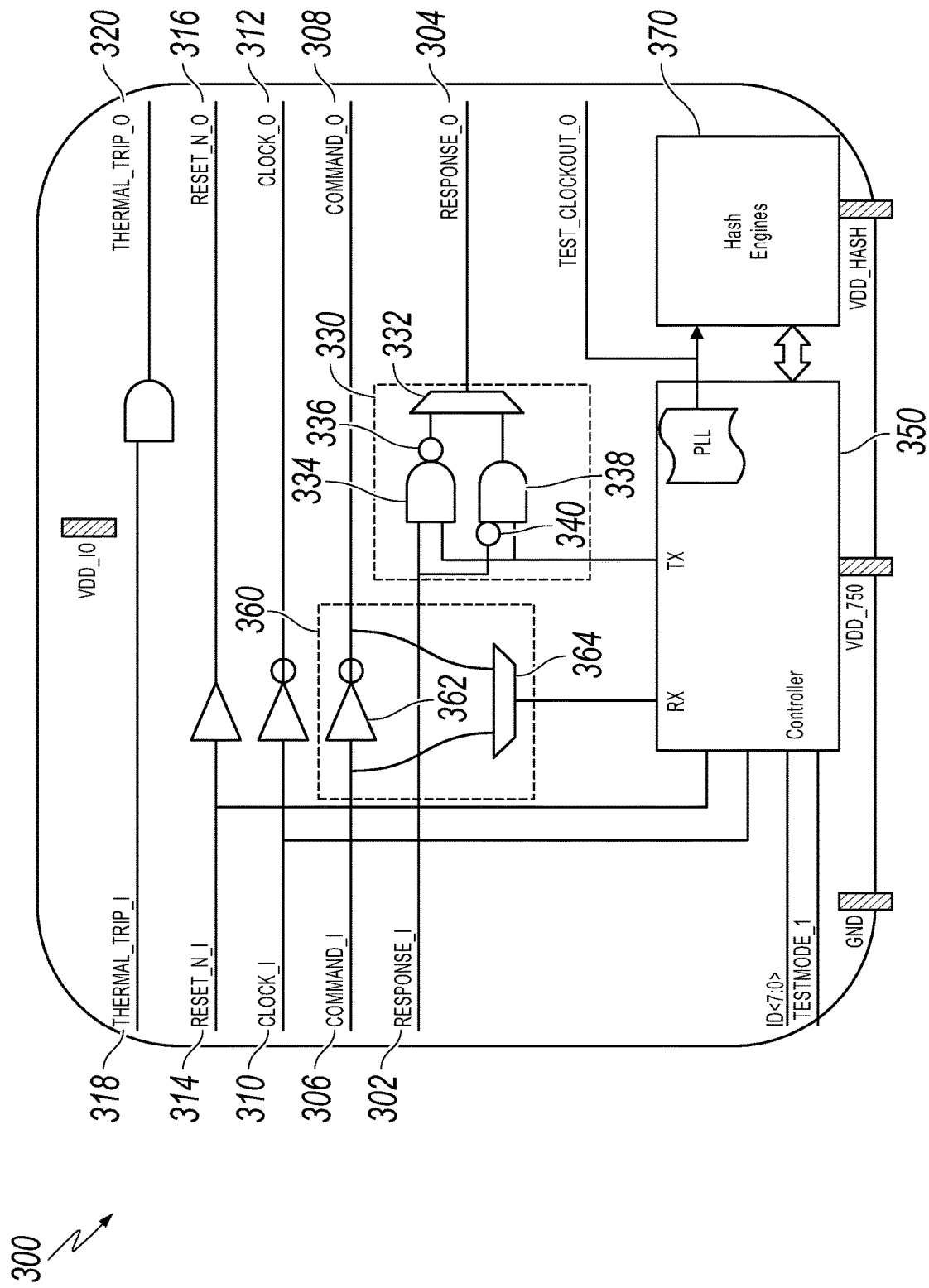
FIG. 3 shows a schematic diagram of an integrated circuit (IC) chip for signal processing, according to some implementations.

FIG. 3 shows a schematic diagram of an integrated circuit (IC) chip 300 for signal processing, according to some implementations of the present disclosure. In some implementations, IC chip 300 is an example of any one of chips 110a-110h, or chips 210a-210h.

As shown, IC chip 300 includes multiple pairs of input and output terminals coupled to multiple buses. For example, IC chip 300 includes input terminal 302 and output terminal 304 coupled to a response bus, input terminal 304 and output terminal 306 coupled to a command bus, input terminal 308 and output terminal 310 coupled to a clock bus, input terminal 312 and output terminal 314 coupled to a reset bus, and input terminal 318 and output terminal 320 coupled to a thermal trip bus.

In some implementations, input terminals 302, 306, 310, 314, and 318 of IC chip 300 are coupled to output terminals of an upstream neighboring chip that is series connected to the IC chip using the multiple buses. In some implementations, output terminals 304, 308, 312, 316, and 320 of IC chip 300 are coupled to input terminals of a downstream neighboring chip that is series connected to the IC chip using the multiple buses.

IC chip 300 further includes circuit 330 for processing signals on the response bus. In some implementations, circuit 330 is configured to receive an input signal at input terminal 302 on the response bus, combine the input signal with a signal sent by controller 350 to generate a combined signal, and transmit the combined signal on the response bus by using output terminal 304.

In the shown example, circuit 330 includes multiplexer 332, AND gates 334 and 338, and inverters 336 and 340. In some implementations, multiplexer 332 is a circuit or a device that can be used to select one out of several input signals based on a control signal and route the selected input signal to an output. In some implementations, each one of AND gates 334 and 338 is a circuit or a device that performs a logical conjunction operation. In some implementations, each one of inverters 336 and 340 is a circuit or a device that performs a logical operation on its input signal and produces the logical complement (inverse) of the input at its output. As shown, an input terminal of inverter 336 is coupled to an output terminal of AND gate 334, and an output terminal of inverter 336 is coupled to an input terminal of multiplexer 332. An input terminal of AND gate 338 is coupled to an output terminal of inverter 340, and an output terminal of AND gate 338 is coupled to an input terminal of multiplexer 332.

In the shown example, multiplexer 332 can be configured to select, based on a control signal, one of two input signals including a first input signal that is received as an output signal of inverter 336 and a second input signal that is received as an output signal of AND gate 338, and transmit the selected input signal on the response bus.

IC chip 300 further includes circuit 360 for processing signals on the command bus. In some implementations, circuit 360 is configured to receive an input signal on the command bus using input terminal 306, invert the input signal to generate an inverted signal, and transmit the inverted signal as an output signal on the second bus using output terminal 308. In some implementations, circuit 360 is further configured to conditionally forward the input signal or the inverted signal to controller 350 based on a control signal received by circuit 360.

In the shown example, circuit 360 includes inverter 362 and multiplexer 364. An input terminal of inverter 362 is coupled to input terminal 306 on the command bus, and an output terminal of inverter 362 is coupled to output terminal 308 on the command bus. Furthermore, the input terminal of inverter 362 is further coupled to a first input terminal of multiplexer 364, and the output terminal of inverter 362 is further coupled to a second input terminal of multiplexer 364.

In some examples, inverter 362 can be configured to invert an input signal received on the command bus to generate an inverted signal. In some examples, multiplexer 364 can be configured to select, based on a control signal, one of two input signals including a first input signal that is received as the input signal of inverter 362 and a second input signal that is received as the inverted signal of inverter 362, and transmit the selected input signal to controller 350.

In some implementation, controller 350 of IC chip 300 is configured to manage and coordinate operations of various components within in IC chip 300. Controller 350 can be configured to serve as an interface between hash engines 370 and other circuits or components of IC chip 300. In some examples, controller 350 can be configured to receive an input signal from circuit 360, and transmits an output signal to circuit 330. In some examples, controller can be communicatively coupled to hash engines 370, and can obtain computation results from hash engines 370.

IC chip 300 further includes one or more hash engines 370. In some implementations, each of the hash engines 370 includes hardware components configured to perform cryptographic hash computations. In some examples, hash engines 370 can perform the cryptographic hash computations using hash function algorithms such as SHA-1, SHA-256, or MD5, etc.

In some implementations, an example operating process of IC chip 300 includes receiving an input signal by IC chip 300 at input terminal 306 on the command bus. In some examples, the input signal can be received from an upstream neighboring chip that is series connected to IC chip 300. IC chip 300 performs an inverting operation on the input signal by using inverter 362 to generate an inverted signal, and transmits the inverted signal on the command bus. In some examples, the inverted signal can be transmitted on the command bus to a downstream neighboring chip that is series connected to IC chip 300. IC chip 300 can further conditionally forward the input signal or the inverted signal to controller 350 based on an odd or even configuration of IC chip 300 in an ordered arrangement of multiple chips including the upstream neighboring chip, IC chip 300, and the downstream neighboring chip. In some examples, when IC chip 300 is an even chip on the command bus, circuit 360 can be instructed to forward the input signal to controller 350. When IC chip 300 is an odd chip on the command bus, circuit 360 can be instructed to forward the inverted signal to controller 350.

After receiving a signal from circuit 360, controller 350 can instruct the hash engines 370 to perform cryptographs hash computations. Hash engines 370 can return a computation result to controller 350.

In some implementations, another example operating process of IC chip 300 includes receiving an input signal by IC chip 300 at input terminal 302 on the response bus. In some examples, the input signal can be received from an upstream neighboring chip that is series connected to IC chip 300. IC chip 300 can combine the input signal and a signal produced by controller 350 by using circuit 330 to generate a combined signal, and transmit the combined signal as an output signal on the response bus. IC chip 300 can combine the input signal and the signal produced by controller 350 based on an even or odd configuration of IC chip 300. In some examples, when IC chip 300 is an even chip on the response bus, IC chip 300 can combine the input signal and the signal produced by controller 350 by using AND gate 334 to generate a combined signal, and invert the combined signal by using inverter 336 to generate an inverted signal as an output signal on the response bus. In some examples, when IC chip 300 is an odd chip on the response bus, IC chip 300 can invert the input signal by using inverter 340 to generate an inverted signal, and combine the inverted signal and the signal produced by controller by using AND gate 338 to generate a combined signal as an output signal on the response bus. In some examples, the output signal of Chip 300 on the response bus can be transmitted to a downstream neighboring chip that is series connected to IC chip 300.

Figure 4:
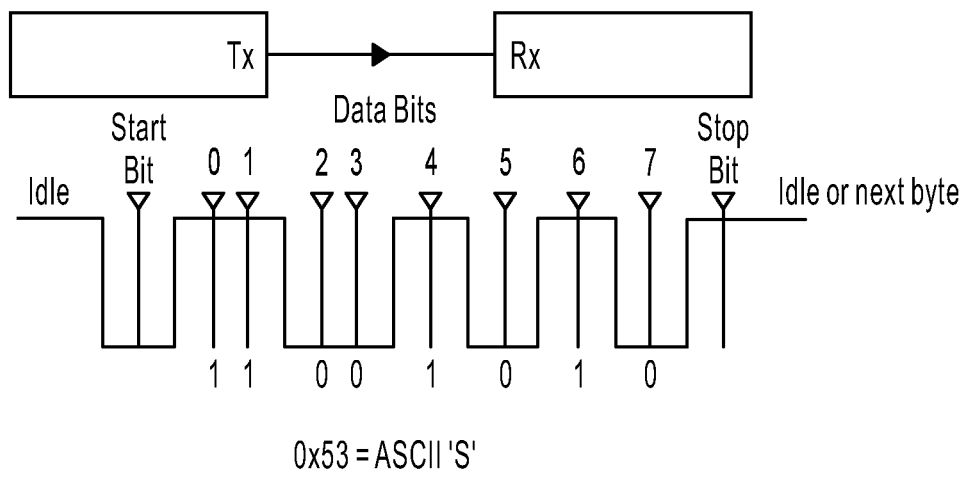
FIG. 4 shows a format of an example signal, according to some implementations.

In some examples, the signal produced by controller 350 can be generated based on one or more computation results from hash engines 370. In some examples, the signal produced by controller 350 can be an idle signal. In some examples, the signal produced by controller 350 has a format as shown in FIG. 4. Referring to FIG. 4, a format of an example signal 400 includes ten bits, where the start bit of signal 400 indicates a logic low state (e.g., "0"), and the stop bit of signal 400 indicates a logic high state (e.g., "1"). The eight bits between the start bit and the stop bit are data bits. In some implementations, an idle signal is a series of bits in a known pattern, e.g., ten bits of 1s. Continuing with the examples with reference to FIG. 3, the data bits of signal 400 can include or indicate the computation results from hash engines 370. In the illustrated example of FIG. 4, the computation result output by a chip is shown to have a binary value of 01010011, which corresponds to a hex value of "0x53" and a symbol of "S."

By using the above combine-and-forward method, the output signal can be promptly transmitted without undergoing synchronization or retiming processes. By eliminating store-and-forward mechanism for data, the circuit minimizes delays typically incurred during those processes. The combining and forwarding of the signals enable swift transmission without latency-inducing operations. Each IC chip includes components to invert communication signals at each chip. This deliberate inversion serves as a beneficial measure to prevent the accumulation of a specific class of noise. By inverting the signal at each chip, the noise that may have been introduced in previous stages of the circuit is counteracted, thus maintaining signal integrity. Each IC chip possesses the ability to self-discover its position within the electronic circuit, allowing it to determine whether it has an odd or even configuration in an ordered arrangement of the number of IC chips in the electronic circuit. This self-discovery enables the IC chip to handle the inversion of the communication signals internally, ensuring that the overall circuit functions as intended.

Figure 5:
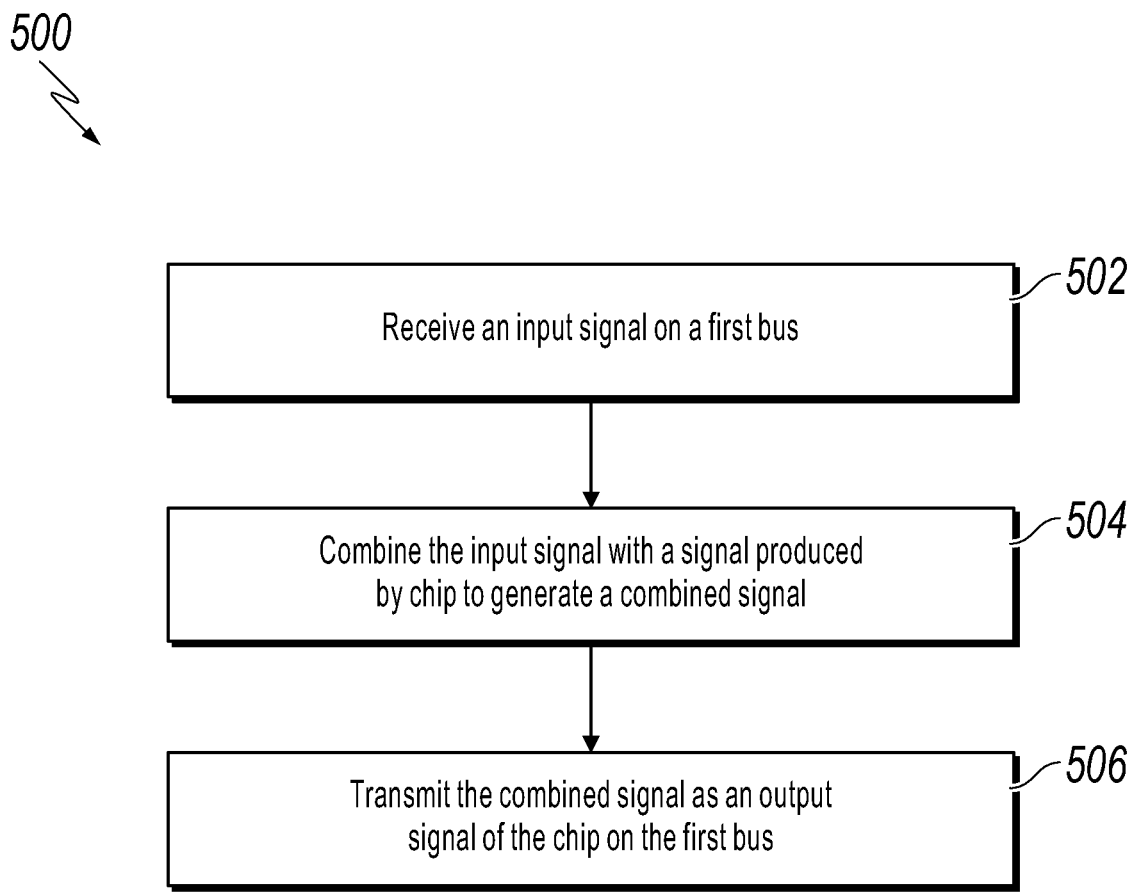
FIG. 5 shows a flowchart of an example process for signal processing, according to some implementations.

FIG. 5 shows a flowchart of an example process 500 for signal processing, in accordance with some implementations of the present disclosure. Process 500 can be performed by any suitable device disclosed herein, such as one or more of chips 110a-110h, 220a-220h, which in some implementations includes circuitry as shown by the exemplary schematic of IC chip 300. Accordingly, the following description of process 500 is provided with respect to IC chip 300. In some implementations, some or all of the operations in process 500 are implemented based on the techniques described in connection with FIGS. 1-4. The operations shown in process 500 may not be exhaustive and that other operations can be performed as well before, after, or in between any of the illustrated operations. Further, some of the operations may be performed simultaneously, or in a different order than shown in FIG. 5.

Process 500 starts when an IC chip (e.g., IC chip 300) receives an input signal on a first bus (502).

In some implementations, the first bus is a response bus (e.g., response bus 160). In some implementations, the IC chip is one of a number of IC chips connected in series (e.g., chips 110a-110h). In some examples, each of the IC chips can include multiple pairs of input terminals and output terminals on multiple buses. Input terminals of a chip are connected to output terminals of an upstream neighboring chip respectively, and output terminals of the chip are connected to input terminals of a downstream neighboring chip respectively. In some implementations, the input signal is received by the IC chip from an upstream neighboring chip connected in series with the IC chip.

The IC chip combines the input signal with a signal produced by the chip to generate a combined signal (504).

In some implementations, the signal produced by the IC chip is provided by a controller circuit (e.g., 350) of the IC chip. In some implementations, the signal produced by the IC chip is generated based on one or more mathematical computations performed by one or more processing units (e.g., has engines 370) of the IC chip. In some implementations, the signal produced by the IC chip includes an indication of a result of one or more cryptographic hash computations. In some implementations, the cryptographic hash computations include blockchain computations.

In some implementations, the IC chip determine an evenness or oddness of the IC chip with respect to a first signal transmission direction on the first bus. The evenness or oddness of the IC chip represents an even or odd numbering of the IC chip in a positioning arrangement of the number of IC chips connected in series.

In some implementations, determining the evenness or oddness of the IC chip with respect to the first signal transmission direction on the first bus includes determining that the first bus is in an idle state (e.g., "1"). In some examples, when the first bus is in the idle state, and if an input signal on the first bus to the IC chip indicates a first logic state (e.g., "1"), the IC chip can be determined as an even chip. When the first bus is in the idle state, and if an input signal on the first bus to the IC chip indicates a second logic state (e.g., "0"), the IC chip can be determined as an odd chip.

In some implementations, when the IC chip is an even chip with respect to the first signal transmission direction on the first bus, the IC chip combines, e.g., by using AND gate 334, the input signal with the signal produced by the chip to generate a combined signal, and inverts, e.g., by using inverter 336, the combined signal to generate an output signal of the IC chip on the first bus.

In some implementations, when the IC chip is an odd chip with respect to the first signal transmission direction on the first bus, the IC chip inverts, e.g., by using inverter 340, the input signal to generate an inverted signal, and combines, e.g., by using AND gate 338, the inverted signal with the signal produced by the IC chip to generate an output signal of the IC chip on the first bus.

The IC chip transmits the combined signal as an output signal of the IC chip on the first bus (506). In some implementations, the IC chip sends the output signal on the first bus to a downstream neighboring chip series connected with the IC chip.

By using the above combine-and-forward method, the output signal can be promptly transmitted without undergoing synchronization or retiming processes. By eliminating store-and-forward mechanism for data, the circuit minimizes delays typically incurred during those processes. The combining and forwarding of the signals enable swift transmission without latency-inducing operations. Each IC chip includes components to invert communication signals at each chip. This deliberate inversion serves as a beneficial measure to prevent the accumulation of a specific class of noise. By inverting the signal at each chip, the noise that may have been introduced in previous stages of the circuit is counteracted, thus maintaining signal integrity. Each IC chip possesses the ability to self-discover its position within the electronic circuit, allowing it to determine whether it has an odd or even configuration in an ordered arrangement of the number of IC chips in the electronic circuit. This self-discovery enables the IC chip to handle the inversion of the communication signals internally, ensuring that the overall circuit functions as intended.

Figure 6:
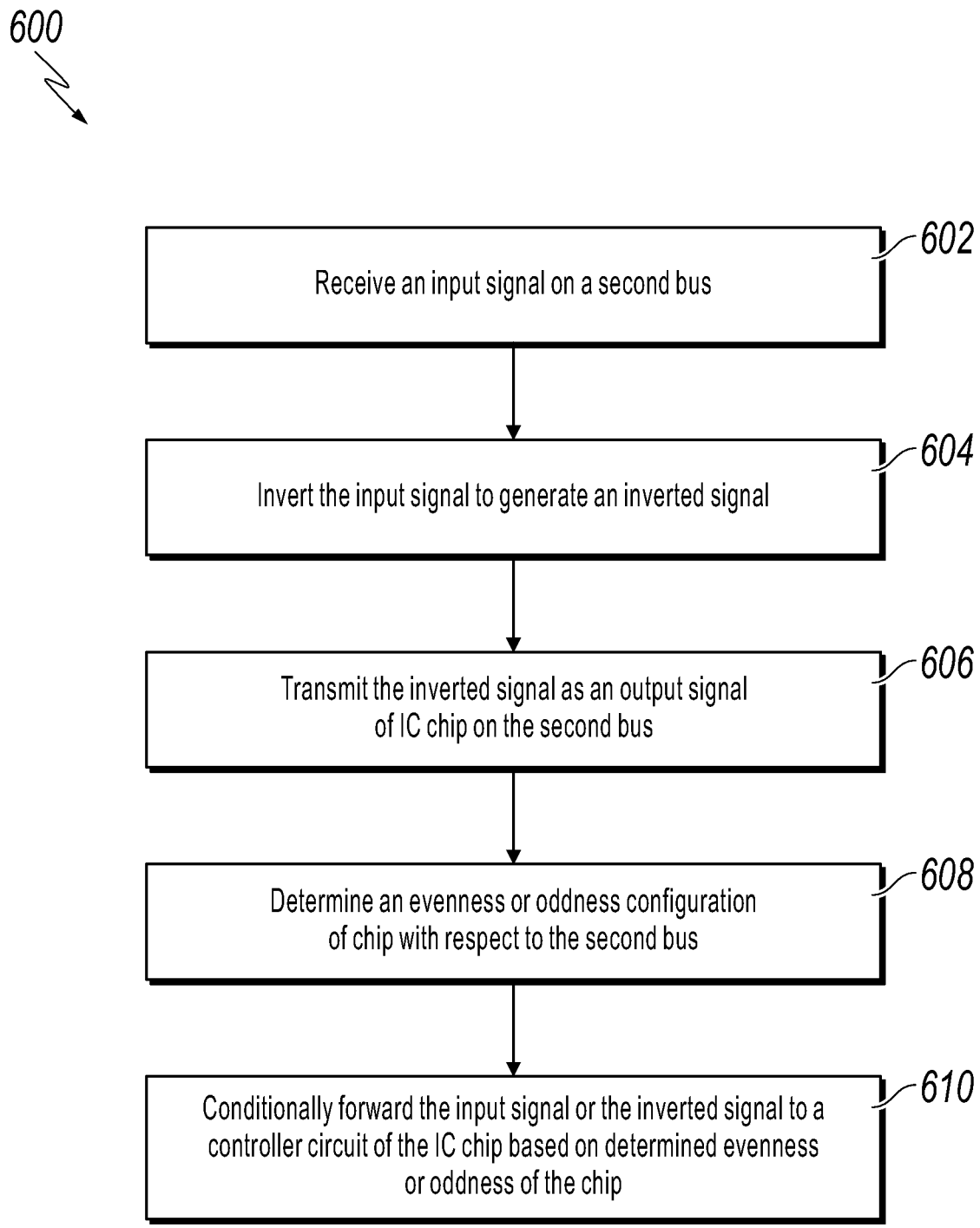
FIG. 6 shows a flowchart of another example process for signal processing, according to some implementations.

FIG. 6 shows a flowchart of an example process 600 for signal processing, in accordance with some implementations of the present disclosure. Process 600 can be performed by any suitable device disclosed herein, such as one or more of chips 110*a*-110*h*, 220*a*-220*h*, or which in some implementations includes circuitry as shown by the exemplary schematic of IC chip 300. Accordingly, the following description of process 600 is provided with respect to IC chip 300. In some implementations, some or all of the operations in process 600 are implemented based on the techniques described in connection with FIGS. 1-4. The operations shown in process 600 may not be exhaustive and that other operations can be performed as well before, after, or between any of the illustrated operations. Further, some of the operations may be performed simultaneously, or in a different order than shown in FIG. 6.

Process 600 starts when an IC chip (e.g., IC chip 300) receives an input signal on a second bus (602).

In some implementations, the second bus is a command bus (e.g., command bus 150). In some implementations, the IC chip is one of a number of IC chips connected in series (e.g., chips 110*a*-110*h*). In some examples, each of the IC chips can include multiple pairs of input terminals and output terminals on multiple buses. Input terminals of a chip are connected to output terminals of an upstream neighboring chip respectively, and output terminals of the chip are connected to input terminals of a downstream neighboring chip respectively. In some implementations, the input signal is received by the IC chip from an upstream neighboring chip connected in series with the IC chip.

The IC chip inverts the input signal to generate an inverted signal (604). In some implementations, the IC chip uses an inverter, e.g., inverter 362, to invert the input signal.

The IC chip transmits the inverted signal as an output signal of the IC chip on the second bus (606). In some implementations, the IC chip sends the output signal on the second bus to a downstream neighboring chip series connected with the IC chip.

The IC chip determines an evenness or oddness of the IC chip with respect to a second signal transmission direction on the second bus (608). The evenness or oddness of the IC chip represents an even or odd numbering of the IC chip in a positioning arrangement of the number of IC chips connected in series.

In some implementations, determining the evenness or oddness of the IC chip with respect to a second signal transmission direction on the second bus including determining that the second bus is in an idle state (e.g., "1"). In some examples, when the second bus is in the idle state, and if an input signal on the second bus to the IC chip indicates a first logic state (e.g., "1"), the IC chip can be determined as an even chip. When the second bus is in the idle state, and if an input signal on the second bus to the IC chip indicates a second logic state (e.g., "0"), the IC chip can be determined as an odd chip.

The IC chip conditionally forwards the input signal or the inverted signal to a controller circuit of the IC chip based on the determined evenness or oddness of the IC chip (610).

In some implementations, when the IC chip is an even chip with respect to the second signal transmission direction on the second bus, the IC chip forwards, e.g., by using circuit 360, the input signal to a controller circuit (e.g., controller 360) of the IC chip.

In some implementations, when the IC chip is an odd chip with respect to the second signal transmission direction on the second bus, the IC chip forwards, e.g., by using circuit 360, the inverted signal to the controller circuit of the IC chip.

As described above, each IC chip includes components to invert communication signals at each chip. This deliberate inversion serves as a beneficial measure to prevent the accumulation of a specific class of noise. By inverting the signal at each chip, the noise that may have been introduced in previous stages of the circuit is counteracted, thus maintaining signal integrity. Each IC chip possesses the ability to self-discover its position within the electronic circuit, allowing it to determine whether it has an odd or even configuration in an ordered arrangement of the number of IC chips in the electronic circuit. This self-discovery enables the IC chip to handle the inversion of the communication signals internally, ensuring that the overall circuit functions as intended.

Figure 7:
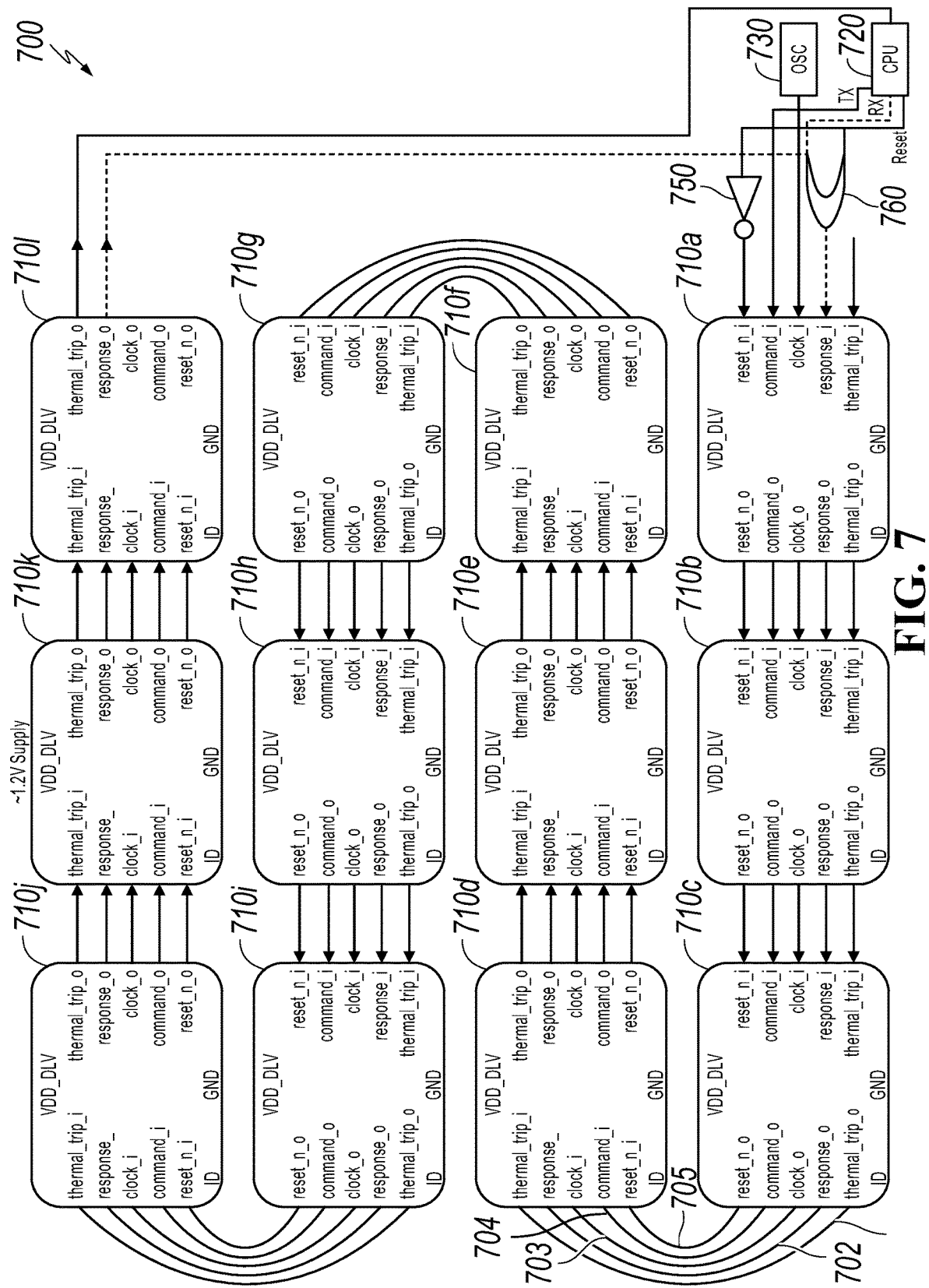
FIG. 7 shows a schematic diagram of an example electronic circuit for signal processing, according to some implementations.

FIG. 7 shows a schematic diagram of an example electronic circuit 700 for signal processing, in accordance with some implementations of the present disclosure. As shown, electronic circuit 700 includes IC chips 710a-710l that are series connected using multiple buses including thermal trip bus 701, response bus 702, clock bus 703, command bus 704, and reset bus 705. Each one of chips 710a-710l has multiple pairs of input and output terminals coupled to the multiple buses, respectively. Chips 710a-710l are connected in series and form a daisy chain by coupling output terminals of one chip to input terminals of a downstream neighboring chip and coupling input terminals of one chip to output terminals of an upstream neighboring chip. Note that electronic circuit 700 is shown to include twelve chips arranged in a single daisy chain for illustrative purposes only. In some implementations, electronic circuit 700 can include any suitable number of chips (e.g., in the order of tens, hundreds, or thousands of chips) arranged in any suitable number of daisy chains.

In some implementations, chips 710a-710l are communicatively coupled to CPU 720. As shown, a transmitting terminal of CPU 720 is coupled to a command input terminal of chip 710a, and a receiving terminal of CPU 720 is coupled to a response output terminal of chip 710l.

In some implementations, each one of chips 710a-710l is an application-specific integrated circuit (ASIC). In some implementations, chips 710a-710l can be configured or customized to perform computations instructed by CPU 720. In some examples, each one of chips 710a-710l can receive an input signal on command bus 704 from CPU 720 instructing chips 710a-710l to perform computations for a particular task. After receiving the input signal, each one of chips 710a-710l can perform the computations indicated by the input signal, and transmit an output signal on response bus 702 to CPU 720.

In some implementations, CPU 720 is configured to carry out arithmetic and logic operations, data manipulations, and control flow management in accordance with operations of electronic circuit 700. In some examples, CPU 720 can include components such as a control unit, an arithmetic logic unit, one or more registers, and one or more caches, etc. The control unit of CPU 720 manages the flow of data between different components of CPU 720, and can be configured to fetch instructions from a memory, decode the instructions, and coordinate execution of the instructions. The arithmetic logic unit can be configured to perform arithmetic operations (e.g., addition, subtraction, multiplication, and division), and logical operations (e.g., AND, OR, and NOT) on data. The registers of CPU 720 can be configured to store temporary data, instructions, and intermediate results during processing. The registers can also include a program counter which keeps track of the address of the next instruction to be executed, and general-purpose registers for storing data. The caches of CPU 720 can be configured to temporarily store frequently accessed data and instructions.

Electronic circuit 700 further includes an oscillator 730 coupled to chips 710a-710l on clock bus 703. In some implementations, oscillator 730 is configured to generate clock signals or timing reference to synchronize the timing of various digital circuits and operations within electronic circuit 700.

In some implementations, one or more components of electronic circuit 700 are similar to one or more components of electronic circuit 100 or electronic circuit 200. For example, in some cases, CPU 720 is similar to CPU 120 or CPU 220. Further, in some cases, each of IC chips 710a-710l is similar to any one of IC chips 110a-110h, or 210a-210h, other than the additional circuitry as described below. Accordingly, in such implementations, the electronic circuit 700 is configured to perform operations similar to those described with respect to electronic circuit 100 or electronic circuit 200, in addition or as an alternative to the operations described below.

Electronic circuit 700 further includes inverter 750. As shown, an output terminal of inverter 750 is coupled to a reset input terminal of chip 710a. In some implementations, invert 750 is configured to invert a reset signal and transmit the inverted reset signal to chip 710a.

Electronic circuit 700 further includes OR gate 760. As shown, a first input terminal of OR gate 760 is coupled to a response output terminal of chip 710l, and a second input terminal of OR gate 760 is coupled to a reset signal source. An output terminal of OR gate 760 is coupled to a response input terminal of chip 710.

In some implementations, OR gate 760 is configured to perform a logical OR operation on its input signals. In some examples, OR gate 760 can accept two input signals and produce a single output signal based on the logical OR operation. The output signal can be a logic high signal (e.g., 1) if at least one of the input signals is high. If all input signals are logic low signals (e.g., 0), the output signal can be low as well.

In some implementations, an output signal on response bus 702 from chip 710l is routed back to chip 710a via OR gate 760. In some implementations, OR gate 760 is configured to reset an input signal to chip 710a based on a reset signal from a reset signal source.

In some implementations, an example operating process of electronic circuit 700 includes sending a signal by CPU 720 on command bus 704 to chips 710a-710l. The signal can indicate a command to perform a particular task. Each one of chips 710a-710l can receive the signal on command bus 704, perform one or more computations, produce one or more computation results, and send the computation results on response bus 702. In some examples, when one of the chips 710a-710l receives the signal on command bus 704, the chip can determine it has data for transmission on response bus 702. If the chip determines that it has data for transmission on response bus 702, the chip can access response bus 702, and determine whether response bus 702 is in an idle state or a busy state. In some implementations, if the chip determines that response bus 702 has been in a first logic state (e.g., logic high state as "1") for a known amount of time following accessing response bus 702, the chip determines that response bus 702 is in the idle state. In some implementations, when the chip determines that response bus 702 is in the idle state, the chip can block communication from upstream chips on response bus 702, and transmit its data on response bus 702. For example, if chip 710c determines that response bus 702 is in the idle state, chip 710c can block communication from chips 710b and 710a. In some examples, the chip can block communication from the upstream chips for a known amount of time, which can be determined based on one or more of a size of the data, a number of chips in electronic circuit 700, or a propagation delay for signal transmission on response bus 702. In some examples, the chip can block communication from the upstream chips until completion of transmission of its data on response bus 702.

In some examples, the chip can determine that response bus 702 is in a busy state upon accessing response bus 702. In some examples, the chip can access response bus 702 for a known amount of time. If the chip determines that response bus 702 is in a second logic state (e.g., logic low state as "0") at one or more time instants during the known amount of time, the chip can determine that response bus 702 is in the busy state. In some implementations, in response to determine that response bus 702 is in the busy state, the chip delays transmitting its data on response bus 702 to avoid collision on response bus 702. In some examples, the chip can determine a delay period based on a characteristic of the chip, and delay transmitting the data on response bus 702 for the determined delay period. In some examples, the characteristic of the chip can include a chip identification (ID) number of the chip.

In some examples, upon expiry of the delay period, the chip can access response bus 702, and determine whether response bus 702 is in an idle state or a busy state. If response bus 702 is in the idle state, the chip can block communication from upstream chips on response bus 702, and transmit its data on response bus 702.

As described herein, FIG. 7 introduces a novel communication bus architecture that employs a loop configuration. The final output of the last chip connects to the input of the first chip, forming a continuous loop. This looping arrangement offers several benefits, including increased efficiency and fault tolerance. To ensure proper system operation during reset, an OR gate is strategically incorporated to break the loop temporarily. This mechanism provides flexibility for system initialization and reconfiguration.

Moreover, the looped nature of the communication channels empowers each chip within the system with the ability to discern the transmission status of other chips. Through this intelligent feature, every chip becomes aware of ongoing transmissions by its counterparts. When a chip detects that another chip is actively transmitting data, it acts prudently by deferring its own communication. This proactive approach prevents collisions, ensuring smooth and uninterrupted data flow.

Furthermore, when a chip initiates its transmission, it blocks communications from the upstream chips in the loop. This deliberate blocking step safeguards against the propagation of the current transmission indefinitely within the loop. By strategically implementing blocking mechanisms, such as logical gates or time-based protocols, the chip effectively manages the flow of information and prevents any potential data repetition issues.

To guarantee the integrity of the transmitted signals, an important consideration is accounting for the time of flight—the time taken for signals to propagate through the communication channels. To address this, the chips in the electronic circuit can implement appropriate blocking periods that encompass the expected time of flight. By temporarily blocking communications from the upstream chips for the calculated duration, the chips ensure that the arriving signals align with the expected timing, which preserves signal integrity and minimizes potential synchronization issues.

Figure 8:
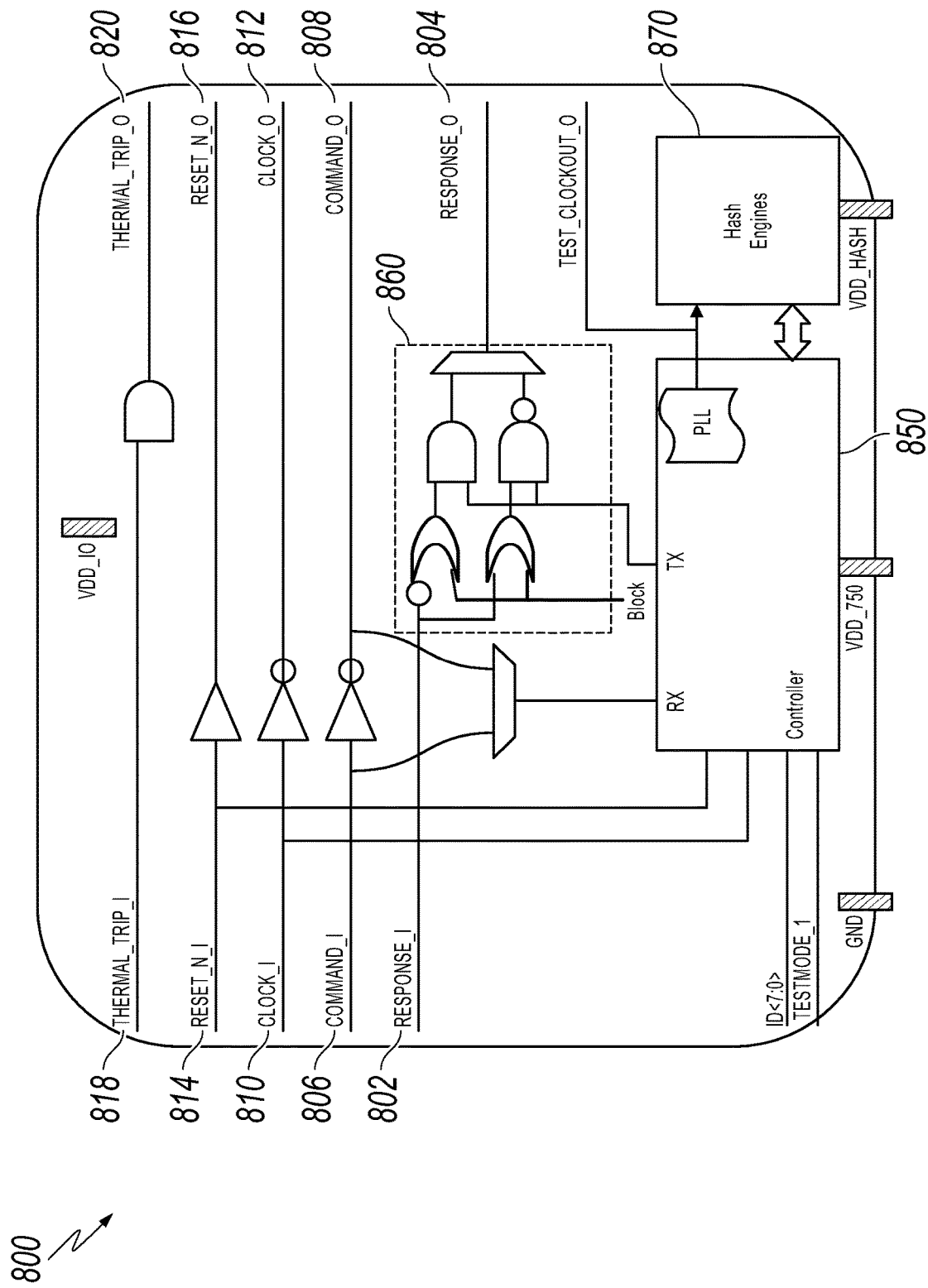
FIG. 8 shows a schematic diagram of an IC chip for signal processing, according to some implementations.

FIG. 8 shows a schematic diagram of an integrated circuit (IC) chip 800, according to some implementations of the present disclosure. In some implementations, IC chip 800 is an example of any one of chips 710a-710l.

As shown, IC chip 800 includes multiple pairs of input and output terminals coupled to multiple buses. For example, IC chip 800 includes input terminal 802 and output terminal 804 coupled to a response bus, input terminal 804 and output terminal 806 coupled to a command bus, input terminal 808 and output terminal 810 coupled to a clock bus, input terminal 812 and output terminal 814 coupled to a reset bus, and input terminal 818 and output terminal 820 coupled to a thermal trip bus.

In some implementations, input terminals 802, 806, 810, 814, and 818 of IC chip 800 are coupled to output terminals of an upstream neighboring chip that is series connected to IC chip 800 using the multiple buses. In some implementations, output terminals 804, 808, 812, 816, and 820 of IC chip 800 are coupled to input terminals of a downstream neighboring chip that is series connected to the IC chip using the multiple buses.

IC chip 800 further includes circuit 860 for processing signals on the response bus. In the shown example, circuit 860 is configured to include two AND gates, two OR gates, two inverters, and a multiplexer. In some implementations, circuit 860 is configured to receive an input signal from input terminal 802 on the response bus, combine the input signal with a signal sent by controller 850 to generate a combined signal, and transmit the combined signal as an output signal on the response bus. In some implementations, circuit 860 is configured to receive a blocking signal and block the input signal received from input terminal 802. In some implementations, circuit 860 receives the blocking signal from controller 850.

IC chip 800 further includes controller 850. In some implementations, controller 850 is configured to manage and coordinate operations of various components within in IC chip 800. Controller 850 can be configured to serve as an interface between hash engines 870 and other circuits or components of IC chip 800. In some examples, controller 850 can be configured to receive an input signal on the command bus, and transmits an output signal to circuit 860. In some examples, controller can be communicatively coupled to hash engines 870, and can obtain computation results from hash engines 870.

IC chip 800 further includes one or more hash engines 870. In some implementations, each of the hash engines 870 includes hardware components configured to perform cryptographic hash computations. In some examples, hash engines 870 can perform the cryptographic hash computations using hash function algorithms such as SHA-1, SHA-256, or MD5, etc.

In some implementations, an example operating process of IC chip 800 includes determining, e.g., by using controller 850, whether IC chip 800 has any data for transmission on the response bus. In some examples, IC chip 800 can receive a signal from controller 850 indicating the data for transmission on the response bus. In some implementations, in response to determining the availability of the data for transmission on the response bus, IC chip 800 accesses the bus, and determine, e.g., by using controller 850, whether the response is in an idle state or a busy state. In some implementations, if IC chip 800 determines that the response bus has been in a first logic state (e.g., a logic high state as "1") for a known amount of time following accessing the bus, IC chip 800 determines that the response bus is in the idle state. In some implementations, in response to determining that the response bus is in the idle state, IC chip 800 blocks, e.g., by using circuit 860, communication from upstream chips on the response bus, and transmit, e.g., by using circuit 860, the data on the response bus. In some examples, IC chip 800 can block the communication from the upstream chips for a known amount of time based on one or more of a size of the data, a number of chips in an electronic circuit that includes IC chip 800, or a propagation delay for signal transmission on the response bus. In some examples, IC chip 800 can block the communication from upstream chips until completion of transmission of the data on the response bus.

In some implementations, if IC chip 800 accesses the response bus for a known amount of time and determines that the response bus is in a second logic state (e.g., a logic low state as "0") at one or more time instants during the known amount of time, IC chip 800 determines that the response bus is in the busy state. In some implementations, in response to determining that the response bus is in the busy state, IC chip 800 delays, e.g., by using controller 850, transmitting the data on the response bus. In some examples, IC chip 800 can determine a delay period based on a characteristic of IC chip 800, and delay transmitting the data on the response bus for the determined delay period. In some examples, the characteristic of the chip can include a chip ID number of the chip.

In some implementations, upon expiry of the delay period, IC chip 800 accesses the response bus, and determines whether the response bus is in an idle state or a busy state. In some implementations, if the response bus is in the idle state, IC chip 800 blocks communication from upstream chips on the response bus, and transmits its data on the response bus.

As described herein, FIG. 8 introduces an IC chip with the ability to discern the transmission status of other chips that are series connected to it. Through this intelligent feature, the chip becomes aware of ongoing transmissions by its counterparts. When the chip detects that another chip is actively transmitting data, it acts prudently by deferring its own communication. This proactive approach prevents collisions, ensuring smooth and uninterrupted data flow.

Furthermore, when the chip initiates its transmission, it blocks communications from the upstream chips. This deliberate blocking step safeguards against the propagation of the current transmission indefinitely within the loop. By strategically implementing blocking mechanisms, such as logical gates or time-based protocols, the chip effectively manages the flow of information and prevents any potential data repetition issues.

To guarantee the integrity of the transmitted signals, an important consideration is accounting for the time of flight—the time taken for signals to propagate through the communication channels. To address this, the chip can implement appropriate blocking periods that encompass the expected time of flight. By temporarily blocking communications from the upstream chips for the calculated duration, the chip ensures that the arriving signals align with the expected timing, which preserves signal integrity and minimizes potential synchronization issues.

Figure 9:
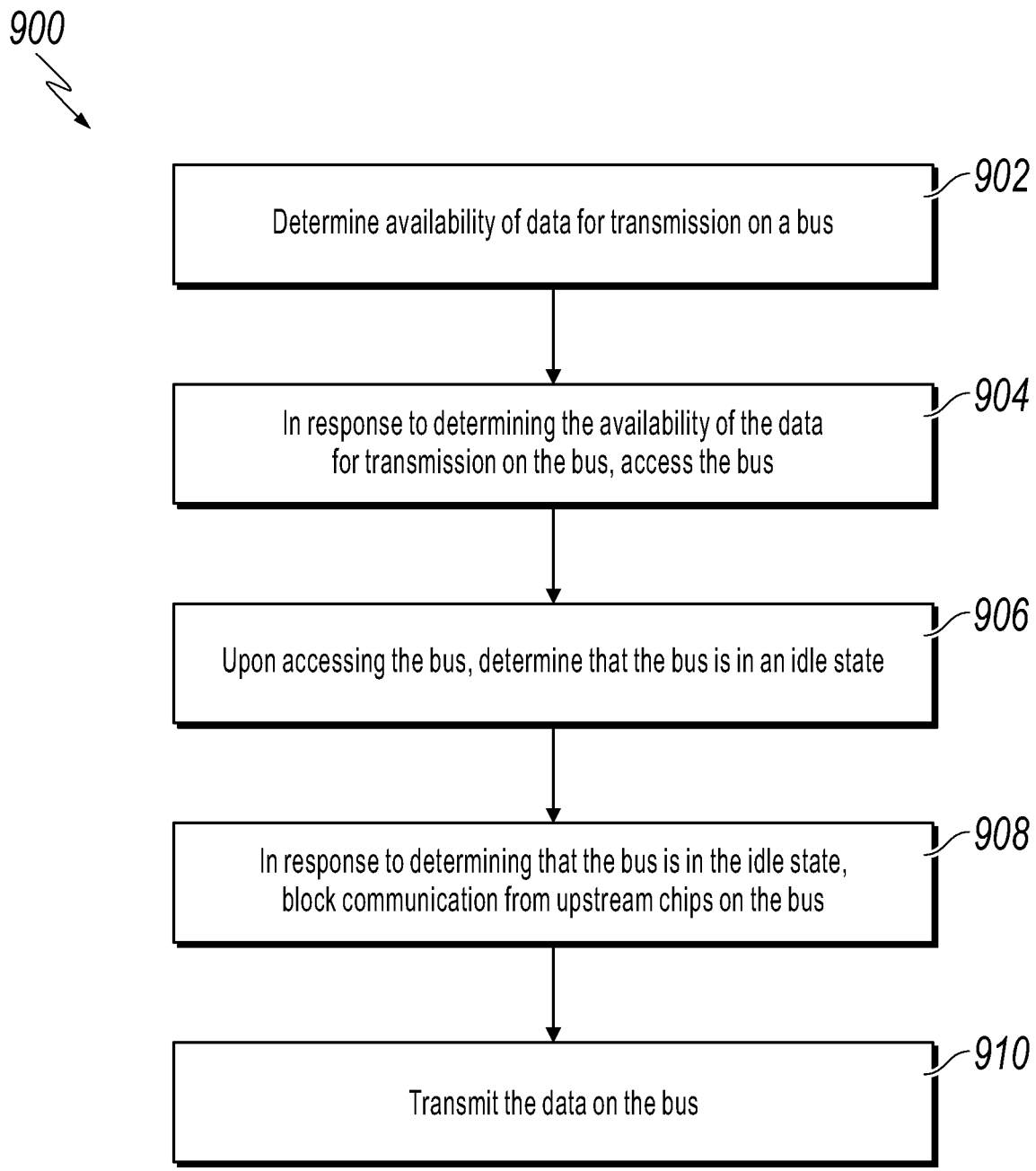
FIG. 9 shows a flowchart of an example process for signal processing, according to some implementations.

FIG. 9 shows a flowchart of an example process 900 for signal processing, in accordance with some implementations of the present disclosure. Process 900 can be performed by any suitable device disclosed herein, such as one or more of chips 710a-710l, which in some implementations includes circuitry as shown by the exemplary schematic of IC chip 800. Accordingly, the following description of process 900 is provided with respect to IC chip 800. In some implementations, some or all of the operations in process 900 are implemented based on the techniques described in connection with FIGS. 7-8. The operations shown in process 900 may not be exhaustive and that other operations can be performed as well before, after, or in between any of the illustrated operations. Further, some of the operations may be performed simultaneously, or in a different order than shown in FIG. 9.

Process 900 starts when an IC chip, e.g., IC chip 800, determines availability of data for transmission on a bus (902). In some examples, the bus is a response bus. In some examples, the IC chip can receive a signal from a controller circuit, e.g., controller 850, of the IC chip indicating the data for transmission on the bus. In some implementations, the IC chip is one of a number of IC chips, e.g., chips 710a-710l, connected in series using multiple buses.

In response to determining the availability of the data for transmission on the bus, the IC chip accesses the bus (904). In some examples, the IC chip can access the bus by sampling the bus periodically.

Upon accessing the bus, the IC chip determines that the bus is in an idle state (906). In some implementations, if the IC chip determines that the bus has been in a first logic state (e.g., a logic high state as "1") for a known amount of time (e.g., 10 bit time) following accessing the bus, the IC chip determines that the bus is in the idle state.

In response to determining that the bus is in the idle state, the IC chip blocks communication from upstream chips on the bus (908). In some examples, the IC chip can block the communication from the upstream chips for a known amount of time based on one or more of a size of the data, a number of the chip connected in series, or a propagation delay for signal transmission on the bus.

While blocking communication from the upstream chips on the bus, the IC chip transmits the data on the bus (910). In some examples, the IC chip can transmit the data on the bus to a downstream neighboring chip in series connected with the IC chip. In some examples, the IC chip can block the communication from the upstream chips until completion of transmission of the data on the bus.

As described herein, each chip in the number of IC chips connected in series has the ability to discern the transmission status of other chips. Through this intelligent feature, every chip becomes aware of ongoing transmissions by its counterparts. When a chip detects that another chip is actively transmitting data, it acts prudently by deferring its own communication. This proactive approach prevents collisions, ensuring smooth and uninterrupted data flow.

Furthermore, when a chip initiates its transmission, it blocks communications from the upstream chips in the loop. This deliberate blocking step safeguards against the propagation of the current transmission indefinitely within the loop. By strategically implementing blocking mechanisms, such as logical gates or time-based protocols, the chip effectively manages the flow of information and prevents any potential data repetition issues.

To guarantee the integrity of the transmitted signals, an important consideration is accounting for the time of flight the time taken for signals to propagate through the communication channels. To address this, a chip can implement appropriate blocking periods that encompass the expected time of flight. By temporarily blocking communications from the upstream chips for the calculated duration, the chip ensures that the arriving signals align with the expected timing, which preserves signal integrity and minimizes potential synchronization issues.

Figure 10:
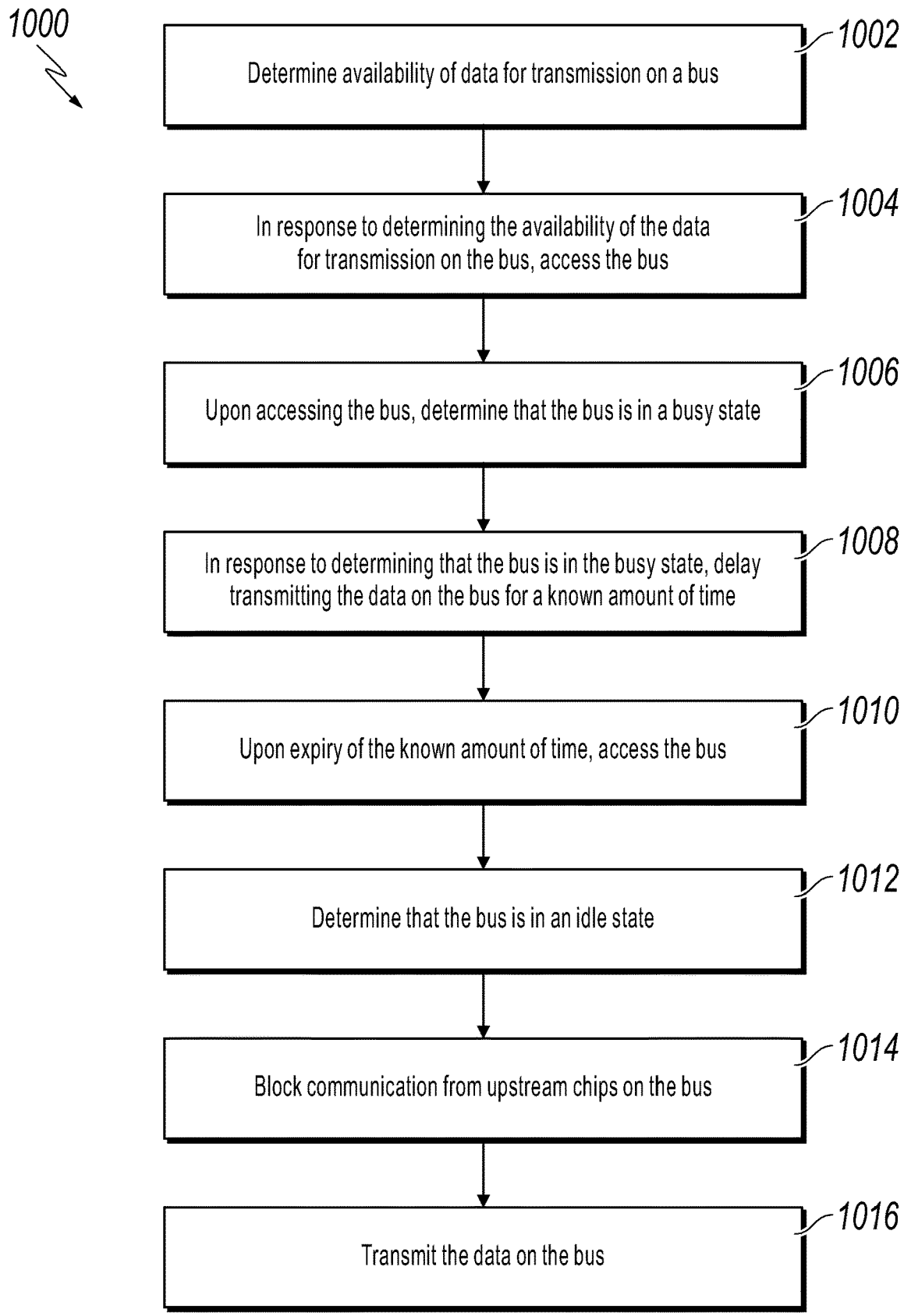
FIG. 10 shows a flowchart of another example process for signal processing, according to some implementations.

FIG. 10 shows a flowchart of an example process 1000 for signal processing, in accordance with some implementations of the present disclosure. Process 1000 can be performed by any suitable device disclosed herein, such as one or more of chips 710a-710l, which in some implementations includes circuitry as shown by the exemplary schematic of IC chip 800. Accordingly, the following description of process 1000 is provided with respect to IC chip 800. In some implementations, some or all of the operations in process 1000 are implemented based on the techniques described in connection with FIGS. 7-8. The operations shown in process 1000 may not be exhaustive and that other operations can be performed as well before, after, or in between any of the illustrated operations. Further, some of the operations may be performed simultaneously, or in a different order than shown in FIG. 10.

Process 1000 starts when an IC chip, e.g., IC chip 800, determines availability of data for transmission on a bus (1002). In some examples, the bus is a response bus. In some examples, the IC chip can receive a signal from a controller circuit, e.g., controller 850, of the IC chip indicating the data for transmission on the response bus. In some implementations, the IC chip is one of a number of IC chips, e.g., chips 710a-710l, connected in series by multiple buses.

In response to determining the availability of the data for transmission on the bus, the IC chip accesses the bus (1004). In some examples, the IC chip can access the bus by sampling the bus periodically.

Upon accessing the bus, the IC chip determines that the bus is in a busy state (1006). In some implementations, if the IC chip accesses the bus for a known amount of time and determines that the bus is in a second logic state (e.g., a logic low state as "0") at one or more time instants during the known amount of time, the IC chip can determine that the bus is in the busy state.

In response to determining that the bus is in the busy state, the IC chip delays transmitting the data on the bus for a known amount of time (1008). In some examples, IC chip 800 can determine a delay period based on a characteristic of IC chip 800, and delay transmitting the data on the response bus for the determined delay period. In some examples, the delay period can be determined based on a characteristic of the IC chip. In some examples, the characteristic of the chip can include a chip ID number of the chip.

Upon expiry of the known amount of time, the IC chip accesses the bus (1010).

Upon accessing the bus, the IC chip determines that the bus is in an idle state (1012). In some implementations, if the IC chip determines that the bus has been in a first logic state (e.g., a logic high state as "1") for a known amount of time (e.g., 10 bit time) following accessing the bus, the IC chip determines that the bus is in the idle state.

In response to determining that the bus is in the idle state, the IC chip blocks communication from upstream chips on the bus (1014). In some examples, the IC chip can block the communication from the upstream chips for a known amount of time based on one or more of a size of the data, a number of the chip connected in series, or a propagation delay for signal transmission on the bus.

While blocking communication from the upstream chips on the bus, the IC chip transmits the data on the bus (1016). In some examples, the IC chip can transmit the data on the bus to a downstream neighboring chip in series connected with the IC chip. In some examples, the IC chip can block the communication from the upstream chips until completion of transmission of the data on the bus.

As described herein, each chip in the number of IC chips connected in series has the ability to discern the transmission status of other chips. Through this intelligent feature, every chip becomes aware of ongoing transmissions by its counterparts. When a chip detects that another chip is actively transmitting data, it acts prudently by deferring its own communication. This proactive approach prevents collisions, ensuring smooth and uninterrupted data flow.

Furthermore, when a chip initiates its transmission, it blocks communications from the upstream chips in the loop. This deliberate blocking step safeguards against the propagation of the current transmission indefinitely within the loop. By strategically implementing blocking mechanisms, such as logical gates or time-based protocols, the chip effectively manages the flow of information and prevents any potential data repetition issues.

To guarantee the integrity of the transmitted signals, an important consideration is accounting for the time of flight—the time taken for signals to propagate through the communication channels. To address this, a chip can implement appropriate blocking periods that encompass the expected time of flight. By temporarily blocking communications from the upstream chips for the calculated duration, the chip ensures that the arriving signals align with the expected timing, which preserves signal integrity and minimizes potential synchronization issues.

It is to be noted that although process steps, method steps, algorithms or the like may be described in a sequential order above, such processes, methods and algorithms may generally be configured to work in alternate orders, unless specifically stated to the contrary.

The processes and logic flows described in this document can be performed by one or more programmable processors executing one or more computer programs to perform the functions described herein. The processes and logic flows can also be performed by, and apparatus can also be implemented as, special purpose logic circuitry, for example, an FPGA or an ASIC (application specific integrated circuit).

Processors suitable for the execution of a computer program include, by way of example, both general and special purpose microprocessors, and any one or more processors of any kind of digital computer. Computer readable media suitable for storing computer program instructions and data can include all forms of nonvolatile memory, media and memory devices. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for signal processing, the method comprising:
receiving, by an integrated circuit (IC) chip of a plurality of IC chips, a first input signal on a first bus connecting the plurality of IC chips in series, wherein the plurality of IC chips are sequentially ordered by a first set of integer indices in a first transmission direction of signals on the first bus, and wherein each IC chip is operable to selectively perform a first sequence of a combining operation and an inverting operation, or a second sequence of an inverting operation and a combining operation depending on whether an integer index of the IC chip is even or odd in the first transmission direction of signals on the first bus;
based at least on whether the integer index of the IC chip is even or odd in the first transmission direction of signals on the first bus, selectively performing, by the IC chip, the first sequence of a combining operation and an inverting operation, or the second sequence of an inverting operation and a combing operation, on a signal produced by the IC chip and the first input signal to generate a first output signal; and
sending, by the IC chip, the first output signal to a next chip of the plurality of IC chips on the first bus.

2. The method of claim 1, wherein the first input signal is received from a previous chip of the plurality of IC chips connected in series on the first bus.

3. The method of claim 2, wherein the first input signal comprises a result of a computation operation performed by the previous chip, and wherein the signal produced by the IC chip comprises a result of a computation operation performed by the IC chip.

4. The method of claim 1, wherein the first output signal sent by the IC chip corresponds to an input signal for the next chip on the first bus, the method further comprising:
performing, by the next chip, a combining operation and an inverting operation on a signal produced by of the next chip and the first output signal to generate an output signal of the next chip.

5. The method of claim 1, comprising:
determining, by the IC chip, whether the integer index of the IC chip is even or odd in the first transmission direction of signals on the first bus.

6. The method of claim 5, wherein determining the whether the integer index of the IC chip is even or odd in the first transmission direction of signals on the first bus comprises:
determining that the first bus is in an idle state; and
in response to determining that the first bus is in the idle state, determining that the integer index of the IC chip is even in the first transmission direction of signals on the first bus when an input signal to the IC chip indicates a first logic state; or
in response to determining that the first bus is in the idle state, determining that the integer index of the IC chip is odd in the first transmission direction of signals on the first bus when an input signal to the IC chip indicates a second logic state,
wherein the first logic state is one of a logic high state or a logic low state, and the second logic state is the other one of the logic high state or the logic low state.

7. The method of claim 5, wherein selectively performing the first sequence of a combining operation and an inverting operation, or the second sequence of an inverting operation and a combining operation, on the signal produced by the IC chip and the first input signal comprises:
in response to determining that the integer index of the IC chip is even in the first transmission direction of signals on the first bus:
performing the combining operation on the signal produced by the IC chip and the first input signal to generate a first combined signal; and
performing the inverting operation on the first combined signal to generate the first output signal.

8. The method of claim 5, wherein selectively performing the first sequence of a combining operation and an inverting operation, or the second sequence of an inverting operation and a combining operation, on the signal produced by the IC chip and the first input signal comprises:
in response to determining that the integer index of the IC chip is odd in the first transmission direction of signals on the first bus:
performing the inverting operation on the first input signal to generate a first inverted signal; and
performing the combining operation on the first inverted signal and the signal produced by the IC chip to generate the first output signal.

9. The method of claim 1, further comprising:
receiving, by the IC chip, a second input signal on a second bus connecting the plurality of IC chips in series;
performing, by the IC chip, an inverting operation on the second input signal to generate a second output signal; and
sending, by the IC chip, the second output signal to the next chip on the second bus.

10. The method of claim 9, further comprising:
determining, by the IC chip, whether the integer index of the IC chip is even or odd in a second signal transmission direction of signals on the second bus.

11. The method of claim 10, wherein determining whether the integer index of the IC chip is even or odd in the second transmission direction of signals on the second bus comprises:
determining that the second bus is in an idle state; and
in response to determining that the second bus is in the idle state, determining that the integer index of the IC chip is even in the second transmission direction of signals on the second bus when an input signal to the IC chip indicates a first logic state; or
in response to determining that the second bus is in the idle state, determining that the integer index of the IC chip is odd in the second transmission direction of signals on the second bus when an input signal to the IC chip indicates a second logic state.

12. The method of claim 10, further comprising one of:
in response to determining that the integer index of the IC chip is even in the second transmission direction of signals on the second bus, sending the second input signal to a controller circuit of the IC chip; or
in response to determining that the integer index of the IC chip is odd in the second transmission direction of signals on the second bus, sending the second output signal to the controller circuit of the IC chip, wherein the controller circuit is configured to provide the signal produced by the IC chip for the combining operation.

13. The method of claim 9, wherein the first bus is a response bus, and the second bus is a command bus.

14. An integrated circuit (IC) chip, comprising:
a plurality of input terminals on a plurality of buses connected to the IC chip, wherein the plurality of input terminals are coupled to output terminals of an upstream neighboring chip of a plurality of chips that is series connected to the IC chip using the plurality of buses;
a plurality of output terminals on the plurality of buses, wherein the plurality of output terminals are coupled to input terminals of a downstream neighboring chip of the plurality of chips,
wherein the plurality of chips comprises the IC chip, the upstream neighboring chip and the downstream neighboring chip;
wherein the plurality of IC chips are sequentially ordered by a first set of integer indices in a first transmission direction of signals on a first bus of the plurality of buses, and wherein each IC chip is operable to selectively perform a first sequence of a combining operation and an inverting operation, or a second sequence of an inverting operation and a combining operation depending on whether an integer index of the IC chip is even or odd in the first transmission direction of signals on the first bus; and
a first circuit for processing signals on the first bus of the plurality of buses, the first circuit configured to:
receive a first input signal on the first bus from the upstream neighboring chip;
based at least on whether the integer index of the IC chip is even or odd in the first transmission direction of signals on the first bus, perform a first sequence of a combining operation and an inverting operation, or the second sequence of an inverting operation and a combing operation, a signal produced by the IC chip and the first input signal to generate a first output signal; and
transmit the first output signal to the downstream neighboring chip on the first bus.

15. The IC chip of claim 14, further comprising:
a controller circuit, wherein the controller circuit is configured to provide the signal produced by the IC chip to the first circuit.

16. The IC chip of claim 15, further comprising at least one processing unit coupled to the controller circuit, the at least one processing unit configured to:
generate the signal based on one or more mathematical computations performed by the at least one processing unit; and
forward the signal to the controller circuit.

17. The IC chip of claim 16, wherein the mathematical computations performed by the at least one processing unit comprises cryptographic hash computations, and
wherein the signal generated by the at least one processing unit comprises an indication of a result of the cryptographic hash computations.

18. The IC chip of claim 17, wherein the cryptographic hash computations comprises blockchain computations.

19. The IC chip of claim 14, wherein the IC chip is configured to:
determine whether the integer index the IC chip is even or odd in the first transmission direction of signals on the first bus.

20. The IC chip of claim 19, wherein the IC chip is configured to:
determine that the first bus is in an idle state; and
in response to determining that the first bus is in the idle state, determining that the integer index of the IC chip is even in the first transmission direction of signals on the first bus when an input signal to the IC chip indicates a first logic state; or
in response to determining that the first bus is in the idle state, determining that the integer index of the IC chip is odd in the first transmission direction of signals on the first bus when an input signal to the IC chip indicates a second logic state,
wherein the first logic state is one of a logic high state or a logic low state, and the second logic state is the other one of the logic high state or the logic low state.

21. The IC chip of claim 20, wherein the first circuit comprises a plurality of AND gates, a plurality of inverters, and a multiplexer, the first circuit configured to:
in response to determining that the integer index of the IC chip is even in the first transmission direction of signals on the first bus:
perform a combining operation on the signal produced by the IC chip and the first input signal to generate a first combined signal; and
perform an inverting operation on the first combined signal to generate the first output signal.

22. The IC chip of claim 21, wherein the first circuit is configured to:
in response to determining that the integer index of the IC chip is odd in the first transmission direction of signals on the first bus:
perform an inverting operation on the first input signal to generate a first inverted signal; and
perform a combining operation on the first inverted signal and the signal produced by the IC chip to generate the first output signal.

23. The IC chip of claim 14, further comprising:
a second circuit for processing signals on a second bus of the plurality of buses, the second circuit configured to:
receive a second input signal on the second bus from the upstream neighboring chip;
invert the second input signal to generate an inverted signal;
transmit the inverted signal to the downstream neighboring chip as a second output signal of the IC chip on the second bus; and
conditionally forward the second input signal or the inverted signal to a controller circuit of the IC chip conditioned on whether an integer index of the IC chip is even or odd in a second transmission direction of signals on the second bus.

24. The IC chip of claim 23, wherein the IC chip is configured to:
determine whether the integer index of the IC chip is even or odd in the second transmission direction of signals on the second bus.

25. The IC chip of claim 24, wherein the IC chip is configured to:
determine that the second bus is in an idle state; and
in response to determining that the second bus is in the idle state, determining that the integer index of the IC chip is even in the second transmission direction of signals on the second bus when an input signal to the IC chip indicates a first logic state; or
in response to determining that the second bus is in the idle state, determining that the integer index of the IC chip is odd in the second transmission direction of signals on the second bus when an input signal to the IC chip indicates a second logic state.

26. The IC chip of claim 24, wherein the second circuit comprises an inverter and a multiplexer, and the second circuit configured to:
in response to a determination that the integer index of the IC chip is even in the second transmission direction of signals on the second bus, send the second input signal to the controller circuit; or
in response to a determination that the integer index of the IC chip is odd in the second transmission direction of signals on the second bus, send the second output signal to the controller circuit.

27. An electronic circuit comprising:
a plurality of integrated circuit (IC) chips that are series connected using a plurality of buses, wherein an IC chip of the plurality of IC chips comprises:
a plurality of input terminals on a plurality of buses connected to the IC chip, wherein the plurality of input terminals are coupled to output terminals of an upstream neighboring chip of a plurality of chips that is series connected to the IC chip using the plurality of buses;
a plurality of output terminals on the plurality of buses, wherein the plurality of output terminals are coupled to input terminals of a downstream neighboring chip of the plurality of chips,
wherein the plurality of chips comprises the IC chip, the upstream neighboring chip and the downstream neighboring chip;
wherein the plurality of IC chips are sequentially ordered by a first set of integer indices in a first transmission direction of signals on a first bus of the plurality of buses, and wherein each IC chip is operable to selectively perform a first sequence of a combining operation and an inverting operation, or a second sequence of an inverting operation and a combining operation depending on whether an integer index of the IC chip is even or odd in the first transmission direction of signals on the first bus; and
a first circuit for processing signals on a first bus of the plurality of buses, the first circuit configured to:
receive a first input signal on the first bus from the upstream neighboring chip;
based at least on whether the integer index of the IC chip is even or odd in the first transmission direction of signals on the first bus, perform a first sequence of a combining operation and an inverting operation, or the second sequence of an inverting operation and a combing operation, a signal produced by the IC chip and the first input signal to generate a first output signal; and
transmit the first output signal to the downstream neighboring chip on the first bus.

28. The electronic circuit of claim 27, wherein the IC chip further comprises:
a controller circuit, wherein the controller circuit is configured to provide the signal produced by the IC chip to the first circuit.

29. The electronic circuit of claim 28, wherein the IC chip further comprises at least one processing unit coupled to the controller circuit, the at least one processing unit configured to:
generate the signal based on one or more mathematical computations performed by the at least one processing unit; and
forward the signal to the controller circuit.

30. The electronic circuit of claim 29, wherein the mathematical computations performed by the at least one processing unit comprises cryptographic hash computations, and
wherein the signal generated by the at least one processing unit comprises an indication of a result of the cryptographic hash computations.

31. The electronic circuit of claim 30, wherein the cryptographic hash computations comprises blockchain computations.

32. The electronic circuit of claim 27, wherein the IC chip is configured to:
determine whether the integer index the IC chip is even or odd in the first transmission direction of signals on the first bus.

33. The electronic circuit of claim 32, wherein the IC chip is configured to:
determine that the first bus is in an idle state; and
in response to determining that the first bus is in the idle state, determining that the integer index of the IC chip is even in the first transmission direction of signals on the first bus when an input signal to the IC chip indicates a first logic state; or
in response to determining that the first bus is in the idle state, determining that the integer index of the IC chip is odd in the first transmission direction of signals on the first bus when an input signal to the IC chip indicates a second logic state,
wherein the first logic state is one of a logic high state or a logic low state, and the second logic state is the other one of the logic high state or the logic low state.

34. The electronic circuit of claim 32, wherein the first circuit comprises a plurality of AND gates, a plurality of inverters, and a multiplexer, the first circuit configured to:
in response to determining that the integer index of the IC chip is even in the first transmission direction of signals on the first bus:
perform a combining operation on the signal produced by the IC chip and the first input signal to generate a first combined signal; and
perform an inverting operation on the first combined signal to generate the first output signal.

35. The electronic circuit of claim 34, wherein the first circuit is configured to:
in response to determining that the integer index of the IC chip is odd in the first transmission direction of signals on the first bus:
perform an inverting operation on the first input signal to generate a first inverted signal; and
perform a combining operation on the first inverted signal and the signal produced by the IC chip to generate the first output signal.

36. The electronic circuit of claim 27, wherein the IC chip further comprises:
a second circuit for processing signals on a second bus of the plurality of buses, the second circuit configured to:
receive a second input signal on the second bus from the upstream neighboring chip;
invert the second input signal to generate an inverted signal;
transmit the inverted signal to the downstream neighboring chip as a second output signal of the IC chip on the second bus; and
conditionally forward the second input signal or the inverted signal to a controller circuit of the IC chip conditioned on whether an integer index of the IC chip is even or odd in a second transmission direction of signals on the second bus.

37. The electronic circuit of claim 36, wherein the IC chip is configured to:
  determine whether the integer index of the IC chip is even or odd in the second transmission direction of signals on the second bus.

38. The electronic circuit of claim 37, wherein the IC chip is configured to:
  determine that the second bus is in an idle state; and
  in response to determining that the second bus is in the idle state, determining that the integer index of the IC chip is even in the second transmission direction of signals on the second bus when an input signal to the IC chip indicates a first logic state; or
  in response to determining that the second bus is in the idle state, determining that the integer index of the IC chip is odd in the second transmission direction of signals on the second bus when an input signal to the IC chip indicates a second logic state.

39. The electronic circuit of claim 37, wherein the second circuit comprises an inverter and a multiplexer, and the second circuit configured to:
  in response to a determination that the integer index of the IC chip is even in the second transmission direction of signals on the second bus, send the second input signal to the controller circuit; or
  in response to a determination that the integer index of the IC chip is odd in the second transmission direction of signals on the second bus, send the second output signal to the controller circuit.

40. The electronic circuit of claim 36, further comprising:
  a central processing unit (CPU) that is configured to transmit control instructions to the plurality of IC chips on the second bus.

* * * * *